US012720592B2

(12) United States Patent
Sugaya et al.

(10) Patent No.: US 12,720,592 B2
(45) Date of Patent: Aug. 25, 2026

(54) COMMUNICATION DEVICE AND COMMUNICATION METHOD

(71) Applicant: SONY GROUP CORPORATION, Tokyo (JP)

(72) Inventors: Shigeru Sugaya, Tokyo (JP); Yusuke Tanaka, Tokyo (JP); Ken Tanaka, Tokyo (JP); Ryuichi Hirata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 331 days.

(21) Appl. No.: 18/547,724

(22) PCT Filed: Dec. 28, 2021

(86) PCT No.: PCT/JP2021/048824
§ 371 (c)(1),
(2) Date: Aug. 24, 2023

(87) PCT Pub. No.: WO2022/185700
PCT Pub. Date: Sep. 9, 2022

(65) Prior Publication Data

US 2024/0137974 A1 Apr. 25, 2024
US 2024/0237058 A9 Jul. 11, 2024

(30) Foreign Application Priority Data

Mar. 2, 2021 (JP) ................................ 2021-033043

(51) Int. Cl.
*H04W 74/02* (2009.01)

(52) U.S. Cl.
CPC .................................. *H04W 74/02* (2013.01)

(58) Field of Classification Search
CPC .............................. H04W 74/02; H04W 84/12
See application file for complete search history.

(56) References Cited

U.S. PATENT DOCUMENTS 9,226,294 B1 * 12/2015 Liu ..................... H04W 74/006
2011/0158159 A1 * 6/2011 Gong .................... H04W 72/21
370/328

(Continued)

FOREIGN PATENT DOCUMENTS

JP 2020-005291 A 1/2020
JP 2020-043588 A 3/2020

(Continued)

OTHER PUBLICATIONS

International Search Report and Written Opinion of PCT Application No. PCT/JP2021/048824, issued on Mar. 29, 2022, 09 pages of ISRWO.

(Continued)

*Primary Examiner* — Marisol Figueroa
(74) *Attorney, Agent, or Firm* — CHIP LAW GROUP

(57) ABSTRACT

A communication device that performs multi-link and multi-user communication is provided. A communication device includes a communication unit capable of wirelessly communicating on a plurality of links, a communication processing unit that performs processing of simultaneously receiving data from a plurality of transmission-side communication devices, and a control unit that performs control to receive data using an optimum link from each of the plurality of transmission-side communication devices. The control unit transmits a trigger request signal for requesting information regarding a transmission opportunity from the plurality of transmission-side communication devices on a link on which a reception opportunity has been acquired, and determines an optimum link for each transmission-side communication device on the basis of a request response signal from the plurality of transmission-side communication devices.

20 Claims, 28 Drawing Sheets

(56) References Cited

U.S. PATENT DOCUMENTS

2014/0269544 A1* 9/2014 Zhu ........................ H04L 1/1671
370/329
2017/0006612 A1* 1/2017 Nabetani ............. H04W 72/563
2020/0068561 A1 2/2020 Lan
2020/0213172 A1* 7/2020 Lee ........................ H04L 5/0094

FOREIGN PATENT DOCUMENTS

WO WO-2013067668 A1 * 5/2013 ............ H04J 3/1694
WO WO-2020222597 A1 11/2020
WO WO-2021010663 A1 1/2021

OTHER PUBLICATIONS

Fischer, et al., "BQRP BQR LCTS DL MU", IEEE 802.11-18/0031r0, Dec. 4, 2017, 20 pages.

* cited by examiner

FIG. 1

BSS1
OBSS2
OBSS3
AP10
STA11
STA12
STA13
STA14
AP20
STA21
STA22
AP30
STA31
STA32

2.4GHz BAND
5GHz BAND A
32
36
40
44
48
52
56
60
64
68
96
5GHz BAND B
5GHz BAND C
100
108
116
124
132
140
149
157
165
173
6GHz BAND A (Unii−5)
6GHz BAND B (Unii−6)
6GHz BAND C (Unii−7)
6GHz BAND D (Unii−8)

FIG. 3

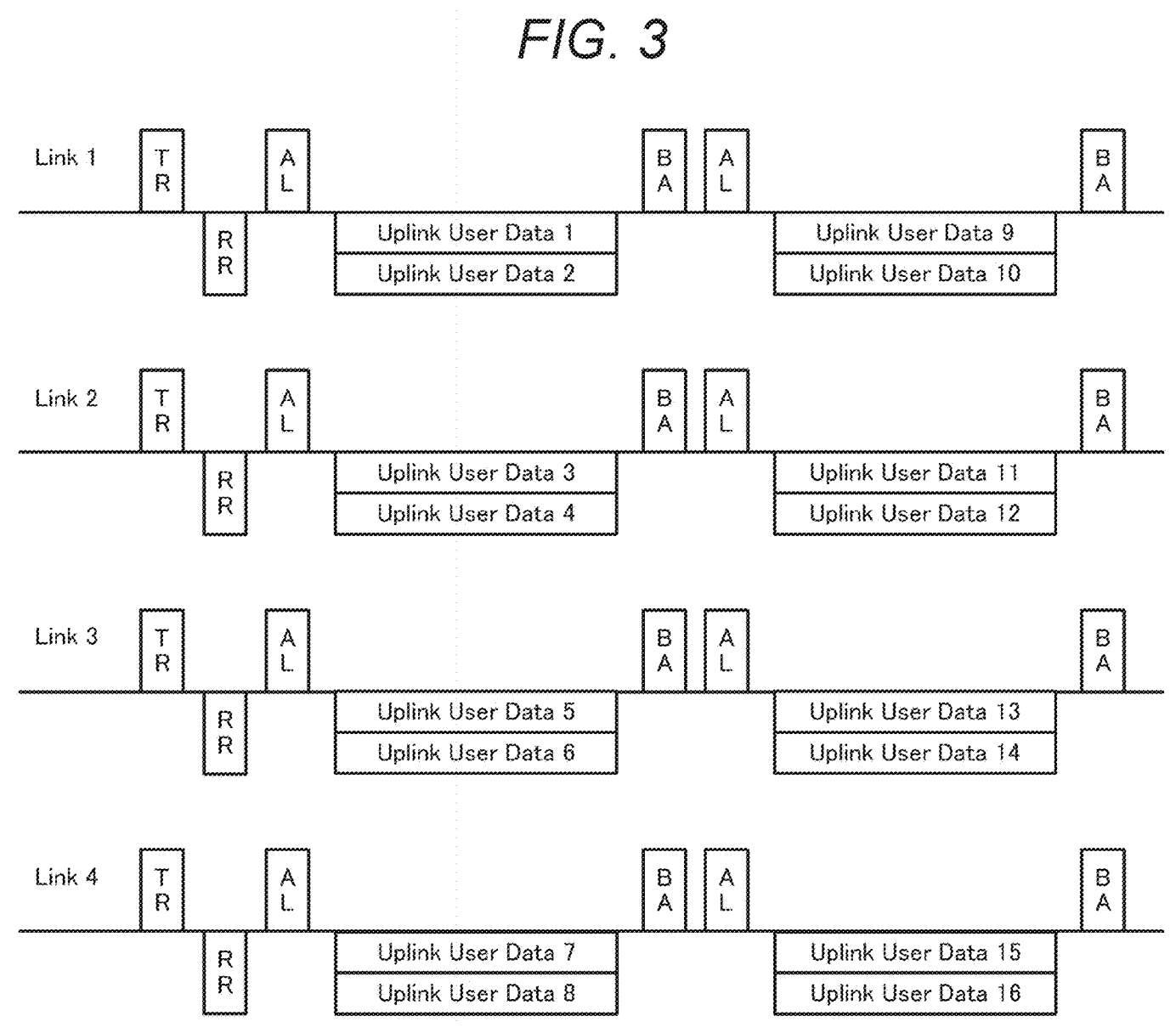

Link 1
TR
RR
AL
Uplink User Data 1
Uplink User Data 2
BA
AL
Uplink User Data 9
Uplink User Data 10
BA Link 2
TR
RR
AL
Uplink User Data 3
Uplink User Data 4
BA
AL
Uplink User Data 11
Uplink User Data 12
BA Link 3
TR
RR
AL
Uplink User Data 5
Uplink User Data 6
BA
AL
Uplink User Data 13
Uplink User Data 14
BA Link 4
TR
RR
AL
Uplink User Data 7
Uplink User Data 8
BA
AL
Uplink User Data 15
Uplink User Data 16
BA

FIG. 5

AP Link N

TR

RR

ACLS

Uplink User Data A

BA

ACLS

Uplink User Data B

Link 1

Link 2

Link 3

Link 4

FIG. 11

Link 1

FIG. 12

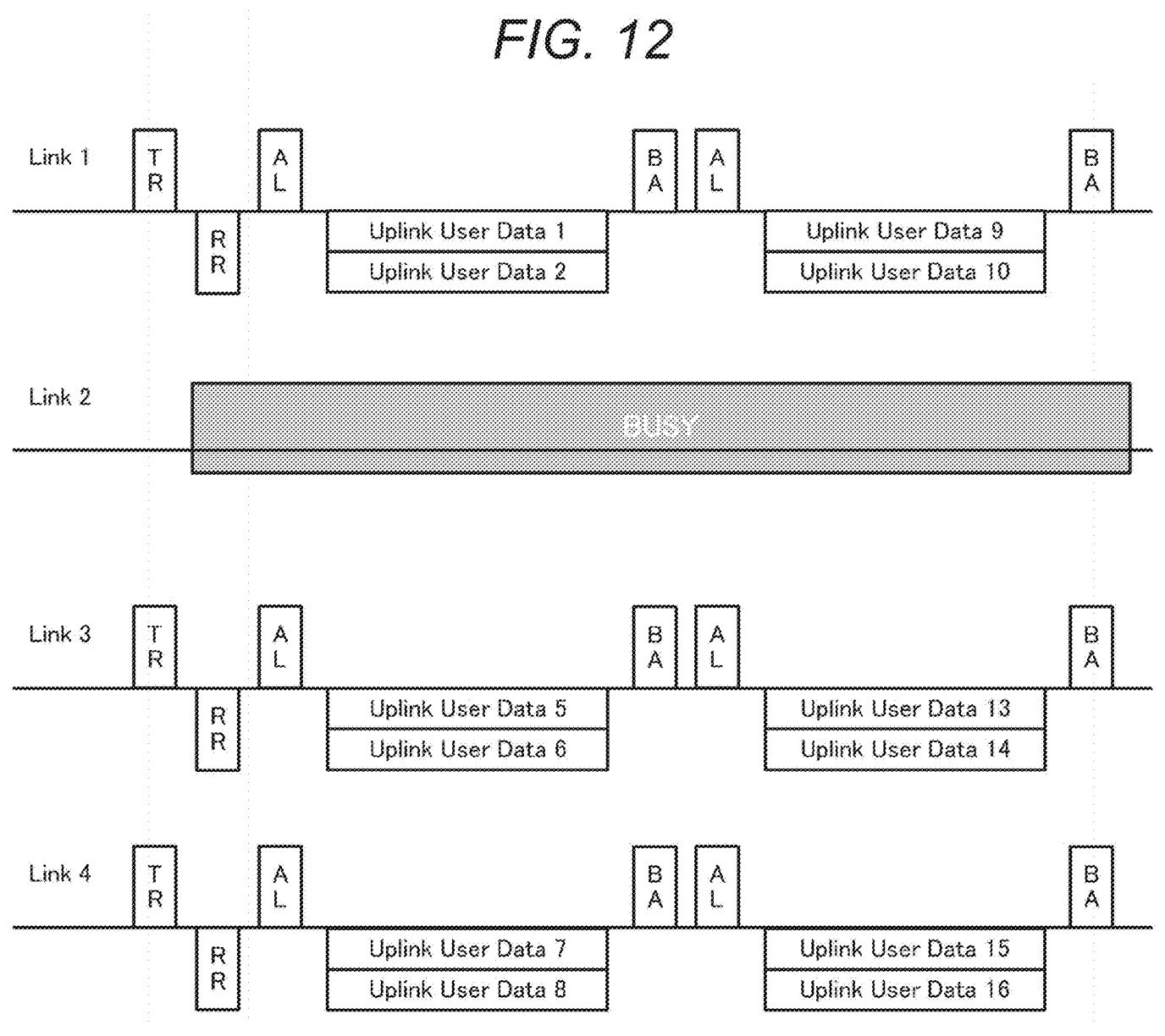

Link 1
TR
RR
AL
Uplink User Data 1
Uplink User Data 2
BA
AL
Uplink User Data 9
Uplink User Data 10
BA Link 2
BUSY Link 3
TR
RR
AL
Uplink User Data 5
Uplink User Data 6
BA
AL
Uplink User Data 13
Uplink User Data 14
BA Link 4
TR
RR
AL
Uplink User Data 7
Uplink User Data 8
BA
AL
Uplink User Data 15
Uplink User Data 16
BA

FIG. 13

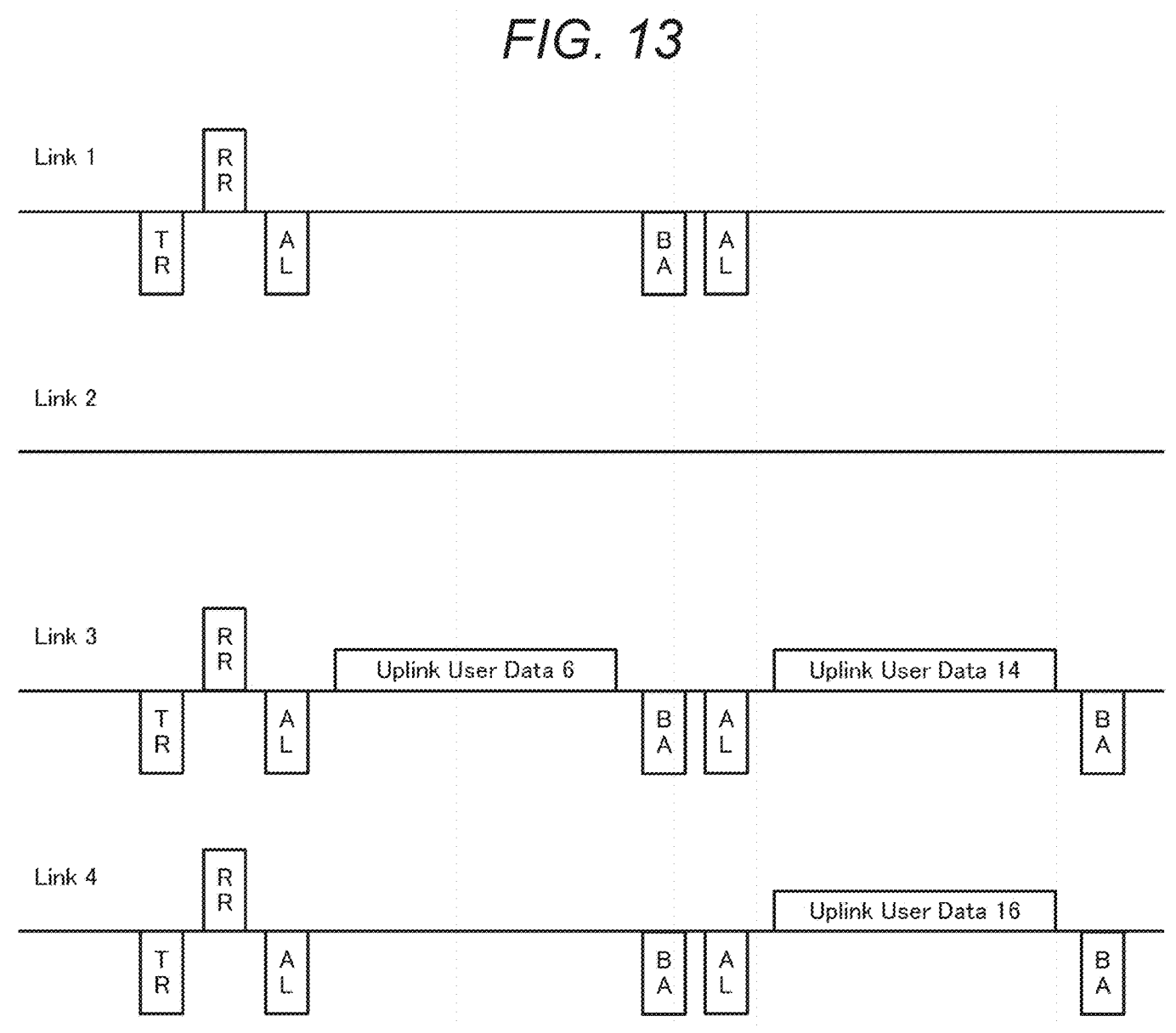

Link 1

TR

RR

AL

BA

AL

Link 2

Link 3

TR

RR

AL

Uplink User Data 6

BA

AL

Uplink User Data 14

BA

Link 4

TR

RR

AL

BA

AL

Uplink User Data 16

Figure 18:
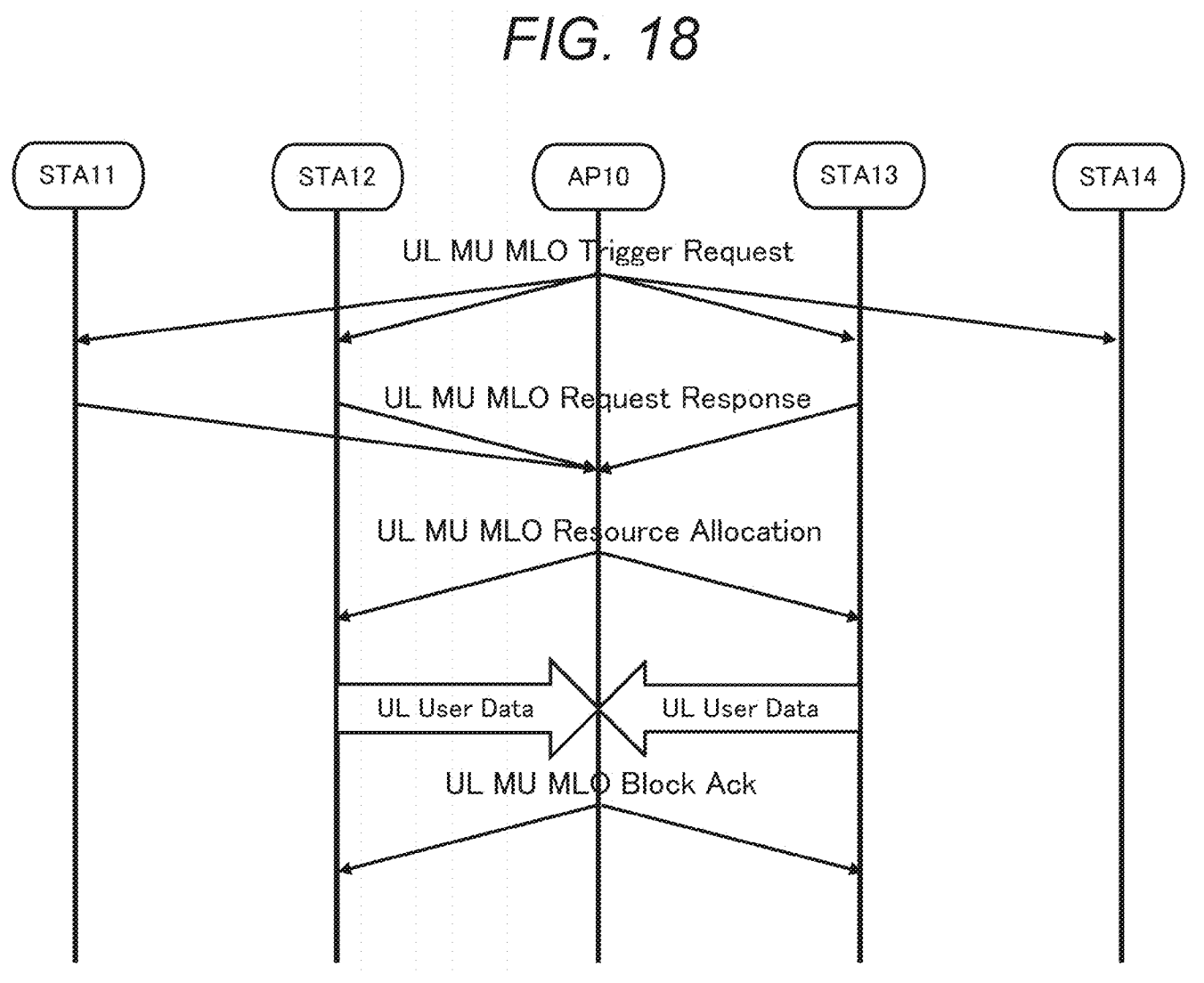

STA11
STA12
AP10
STA13
STA14
UL MU MLO Trigger Request
UL MU MLO Request Response
UL MU MLO Resource Allocation
UL User Data
UL User Data
UL MU MLO Block Ack

FIG. 20

| Type | MU MLO variant |
|---|---|
| 0 | Reserved |
| 1 | DL Trigger Request |
| 2 | DL Request Response |
| 3 | DL Allocation |
| 4 | Reserved |
| 5 | UL Trigger Request |
| 6 | UL Request Response |
| 7 | UL Allocation |
| 8-15 | Reserved |

FIG. 25

MU MLO Information Element (Uplink Allocation)

| Type:07 | Length | Multi-Link Information | Multi-User Information | Current RXOP Duration | Total RXOP Duration | ACK Policy | After Allocation |
|---|---|---|---|---|---|---|---|

Multi-Link Information

| Multi-Link Counts | Allocate Multi-Link Bitmap | Multi-Link Allocation |
|---|---|---|

Multi-User Information

| Multi-User Allocation | Num of Streams | 1st User Info | | ... | Mth User Info | |
|---|---|---|---|---|---|---|
| | | Resource | Device | | Resource | Device |

| BA Type | Block Ack Frame Variant |
|---|---|
| 0 | Reserved |
| 1 | Extended Compressed |
| 2 | Compressed |
| 3 | Multi-TID |
| 4-5 | Reserved |
| 6 | GCR |
| 7-9 | Reserved |
| 10 | GLK-GCR |
| 11 | Multi-STA |
| 12 | MU-MLO |
| 13-15 | Reserved |

FIG. 27

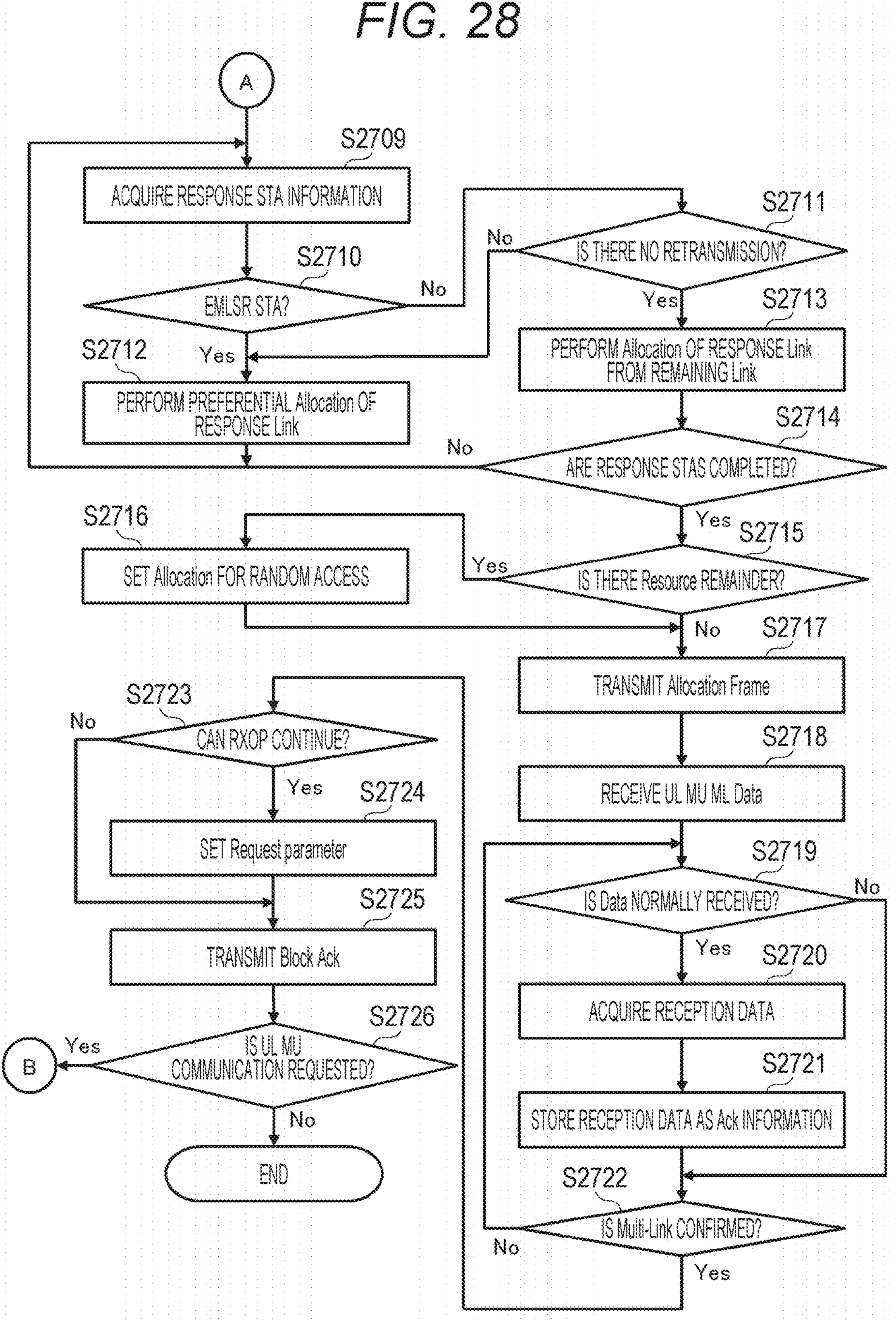
FIG. 28
A
S2709
ACQUIRE RESPONSE STA INFORMATION
S2710
EMLSR STA?
No
Yes
S2711
IS THERE NO RETRANSMISSION?
No
Yes
S2712
PERFORM PREFERENTIAL Allocation OF RESPONSE Link
S2713
PERFORM Allocation OF RESPONSE Link FROM REMAINING Link
S2714
ARE RESPONSE STAS COMPLETED?
No
Yes
S2715
IS THERE Resource REMAINDER?
Yes
No
S2716
SET Allocation FOR RANDOM ACCESS
S2717
TRANSMIT Allocation Frame
S2718
RECEIVE UL MU ML Data
S2719
IS Data NORMALLY RECEIVED?
No
Yes
S2720
ACQUIRE RECEPTION DATA
S2721
STORE RECEPTION DATA AS Ack INFORMATION
S2722
IS Multi-Link CONFIRMED?
No
Yes
S2723
CAN RXOP CONTINUE?
No
Yes
S2724
SET Request parameter
S2725
TRANSMIT Block Ack
S2726
IS UL MU COMMUNICATION REQUESTED?
Yes
B
No
END

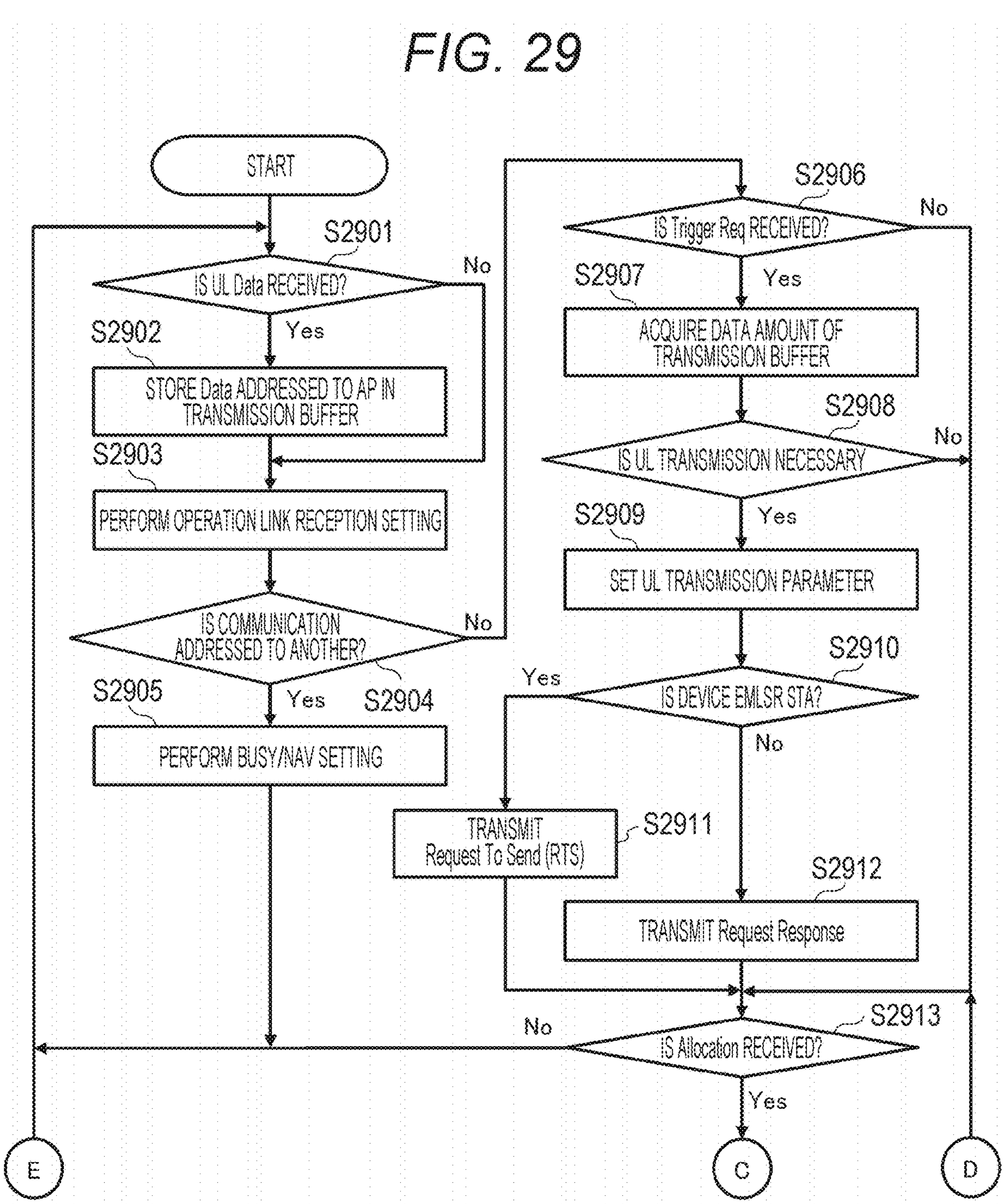
FIG. 29
START
S2901
IS UL Data RECEIVED?
No
Yes
S2902
STORE Data ADDRESSED TO AP IN TRANSMISSION BUFFER
S2903
PERFORM OPERATION LINK RECEPTION SETTING
IS COMMUNICATION ADDRESSED TO ANOTHER?
No
Yes
S2904
S2905
PERFORM BUSY/NAV SETTING
S2906
IS Trigger Req RECEIVED?
No
Yes
S2907
ACQUIRE DATA AMOUNT OF TRANSMISSION BUFFER
S2908
IS UL TRANSMISSION NECESSARY
No
Yes
S2909
SET UL TRANSMISSION PARAMETER
S2910
IS DEVICE EMLSR STA?
Yes
No
TRANSMIT Request To Send (RTS)
S2911
S2912
TRANSMIT Request Response
S2913
IS Allocation RECEIVED?
No
Yes
E
C
D

COMMUNICATION DEVICE AND COMMUNICATION METHOD

CROSS REFERENCE TO RELATED APPLICATIONS

This application is a U.S. National Phase of International Patent Application No. PCT/JP2021/048824 filed on Dec. 28, 2021, which claims priority benefit of Japanese Patent Application No. JP 2021-033043 filed in the Japan Patent Office on Mar. 2, 2021. Each of the above-referenced applications is hereby incorporated herein by reference in its entirety.

TECHNICAL FIELD

The technology disclosed in the present description (hereinafter, "the present disclosure") relates to a communication device and a communication method for performing wireless communication.

BACKGROUND ART

With an increase in use of a wireless local area network (LAN) system and an increase in content capacity, communication of a predetermined data amount is getting insufficient in a case where a channel of only one frequency band is used. Therefore, as a technical study for a successor standard of IEEE 802.11ax, a method of performing higher-density data communication using a plurality of frequency bands (links) in parallel, specifically, a multi-link operation (MLO) technology of collectively transmitting a group of contents using a plurality of frequency bands (links) is studied in a task group TG be of IEEE.

In this multi-link operation, there is a demand for a technology that regards a plurality of frequency bands (links) as one transmission path and uses the transmission path for communication. In the technology, although Enhanced Multi-Link Multi Radio (EMLMR) is assumed as a device including a plurality of wireless communication units so that transmission and reception can be performed simultaneously on all links, Enhanced Multi-Link Single Radio (EMLSR) is also assumed as a configuration of a communication device that can perform only transmission or reception on one link.

In conventional multi-link operation, a configuration in which both an access point and a communication device simultaneously perform communication using the same plurality of links is assumed.

On the other hand, in an existing wireless LAN system, multi-user multiplex communication has been put into practical use. For example, there has been proposed a wireless LAN system that multiplexes and transmits more data by simultaneously transmitting and receiving a plurality of streams on one frequency channel. Specifically, any resource is allocated from an access point to each of a plurality of communication terminals and transmitted, and each communication terminal on the reception side can receive desired data by separating and decoding each resource.

That is, in conventional downlink multi-user (DL MU) communication, even in a case where data is unilaterally multiplexed and transmitted from an access point, all communication terminals perform reception on the frequency channels (links), and data for each user can be obtained by separation on the basis of information described in header information of a received frame. Furthermore, in conventional uplink multi-user (UL MU) communication, even in a case where the access point allocates resources to a plurality of subordinate communication terminals and each of the communication terminals multiplexes and transmits data, the access point performs reception on the frequency channels (links), and data for each user can be obtained by separation on the basis of information described in header information of each received frame.

In IEEE 802.11ax, regarding resource allocation in multiplex communication, in a case of performing uplink and downlink multi-user multiplex communication, an AP performs notification of Bandwidth Query Report Poll (BQRP) Trigger Frame, STAs, in response to this, return Bandwidth Query Report (BQR) including available channel information in Bandwidth Query Report Control Subfield, and the AP performs resource allocation on the basis of the BQR from the STAs (see, for example, Non-Patent Document 1).

CITATION LIST

Non-Patent Document

Non-Patent Document 1: IEEE 802.11ax Contribution (IEEE 802.11-18/0031r0)

SUMMARY OF THE INVENTION

Problems to be Solved by the Invention

An object of the present disclosure is to provide a communication device and a communication method for performing wireless communication with a plurality of users using a plurality of frequency bands.

Solutions to Problems

The present disclosure has been made in view of the issue described above, and a first aspect thereof is a communication device including a communication unit capable of wirelessly communicating on a plurality of links, a communication processing unit that performs processing of simultaneously receiving data from a plurality of transmission-side communication devices, and a control unit that performs control to receive data using an optimum link from each of the plurality of transmission-side communication devices.

The control unit performs control to transmit a trigger request signal for requesting information regarding a transmission opportunity from the plurality of transmission-side communication devices on a link on which a reception opportunity has been acquired.

Furthermore, the control unit determines an optimum link for each transmission-side communication device on the basis of a request response signal from the plurality of transmission-side communication devices. Then, the control unit controls simultaneous data reception from the plurality of transmission-side communication devices using the plurality of links on the basis of information regarding a link allocated to each transmission-side communication device and information regarding multi-user multiplex communication.

Furthermore, a second aspect of the present disclosure is a communication method in a communication device capable of wirelessly communicating on a plurality of links, the method including a step of determining an optimum link for each of the plurality of transmission-side communication devices, and a step of simultaneously receiving data from a plurality of reception-side communication devices using an optimum link of each transmission-side communication device.

Furthermore, a third aspect of the present disclosure is a communication device including a communication unit capable of wirelessly communicating on a plurality of links, a communication processing unit that performs processing of receiving data addressed to the communication device among data simultaneously transmitted from a reception-side communication device to a plurality of transmission-side communication devices, and a control unit that notifies the reception-side communication device of a transmission opportunity of a link available to the communication device, and performs control to transmit data simultaneously with another transmission-side communication device on a link designated by the reception-side communication device.

The control unit performs control to return a request response signal on a link on which a transmission opportunity has been acquired in response to reception of a trigger request signal from the reception-side communication device.

Then, the control unit performs control to wait for a signal on a link on which the request response signal has been transmitted. Here, the control unit receives an allocation signal including information regarding allocation of a transmission resource from the reception-side communication device, and performs control to transmit data to the reception-side communication device using a resource allocated to transmission of the communication device in the allocation signal.

Furthermore, a fourth aspect of the present disclosure is a communication method in a communication device capable of wirelessly communicating on a plurality of links, the method including a step of notifying a reception-side communication device of information regarding a transmission opportunity of a link available to the communication device, and a step of transmitting data addressed to the reception-side communication device simultaneously with another transmission-side communication device on a link designated by the reception-side communication device.

Effects of the Invention

According to the present disclosure, a communication device and a communication method for performing wireless communication with a plurality of users using a plurality of links can be provided.

Note that the effects described in the present specification are merely examples, and the effects brought by the present disclosure are not limited thereto. Furthermore, the present disclosure may further provide additional effects in addition to the effects described above.

Still another object, feature, and advantage of the present disclosure will become clear by further detailed description with reference to an embodiment to be described below and the attached drawings.

BRIEF DESCRIPTION OF DRAWINGS

FIG. 1 is a diagram illustrating states of networks of a wireless LAN system.

FIG. 3 is a diagram illustrating an example in which uplink multi-user multiplex communication is applied to the MLO.

FIG. 5 is a diagram illustrating another modification in which uplink multi-user multiplex communication is applied to the MLO.

FIG. 8 is a diagram illustrating an example of a usage detection status of the multi-links in an STA 11 subordinate to the AP 10.

FIG. 11 is a diagram illustrating an example of a usage detection status of the multi-links in an STA 14 subordinate to the AP 10.

FIG. 12 is a diagram illustrating an implementation example in which uplink multi-user communication is applied to the multi-links in the AP 10.

FIG. 13 is a diagram illustrating an implementation example in which uplink multi-user communication is applied to the multi-links in the STA 11 subordinate to the AP 10.

FIG. 18 is a diagram illustrating a sequence example of uplink multi-user multiplex communication on a link 4.

FIG. 20 is a diagram illustrating an internal configuration of a wireless communication module 1905.

FIG. 25 is a diagram illustrating a configuration of an MU MLO Information Element field of a UL Allocation (AL) frame.

FIG. 27 is a flowchart illustrating operation performed by an access point during uplink communication.

FIG. 28 is a flowchart illustrating operation performed by the access point during the uplink communication.

FIG. 29 is a flowchart illustrating operation performed by a communication terminal during uplink communication.

MODE FOR CARRYING OUT THE INVENTION

Figure 2:
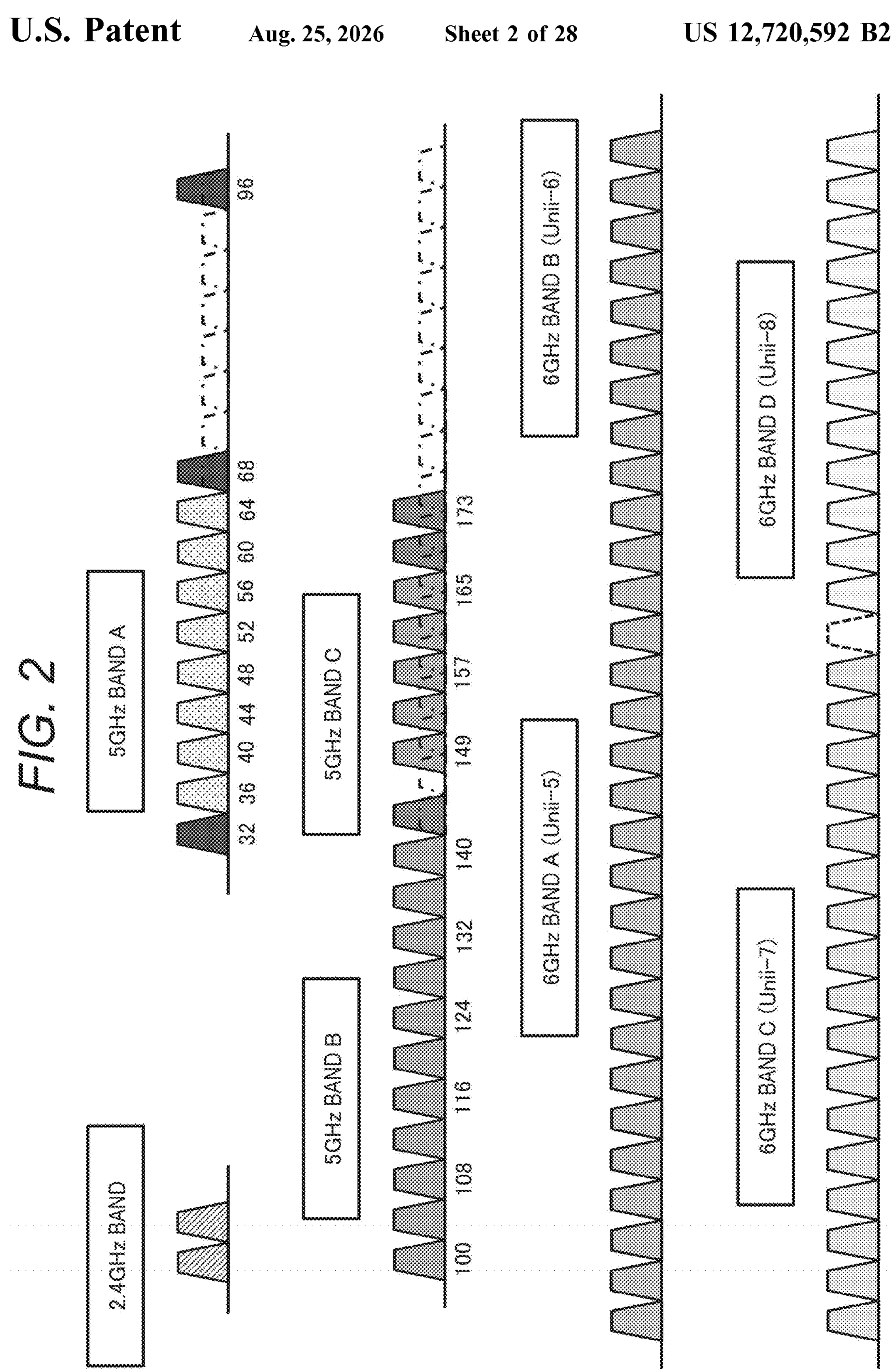
FIG. 2 is a diagram illustrating an example of frequency bands and channel allocation used in the wireless LAN system.

Hereinafter, the present disclosure will be described in the following order with reference to the drawings.

A. Overview

B. Network Configuration

C. Downlink Multi-User Multiplex Communication Applied to MLO

D. Usage Detection Statuses of Multi-Links in AP and STA

E. Implementation Example in Which Downlink Multi-User Communication is Applied to Multi-Links F. Sequence of Downlink Multi-User Multiplex Communication of Each Link G. Configuration of Wireless Communication Device H. Frame Configuration I. Operation Example of Downlink Communication J. Effects

A. Overview

From the viewpoint of securing compatibility with a conventional wireless LAN system, in a case where a transmission path is being used on one of a plurality of frequency bands (links), there are an issue that transmission using the frequency band (link) cannot be performed and an issue that timing at which transmission is possible differs for each of the frequency bands (links). Furthermore, random backoff needs to be set for each of the frequency bands (links), but there is also an issue that transmission is not simultaneously started on each of the frequency bands (links) depending on a set value of the random backoff even if the transmission path is in an empty state.

Moreover, even if a link is available in a certain communication device, the link may not be available in another communication device, and thus, there is also an issue that simultaneously transmitting data addressed to a plurality of communication devices is difficult. For example, in a case where an access point uses three links from a first link to a third link for multi-link operation, the first link and the second link may be available in a certain communication terminal connected to the access point, but the first link and the third link may be available in another communication terminal.

Regarding multi-link operation, as communication terminals that cannot simultaneously receive a plurality of links, devices that are Enhanced Single Radio also exist on a network. Therefore, a technology that does not contradict operation of these communication devices is required to be established.

In conventional downlink multi-user communication, all reception-side communication devices perform reception on the frequency channels (links). Here, in a case where another basic service set (BSS) that exists in an overlapping manner in the vicinity, that is, an overlapping basic service set (OBSS) exists, there is a high possibility that some reception-side communication devices of multi-link operation cannot correctly receive the header information.

However, in BQRP Trigger Frame standardized in IEEE 802.11ax, there is an issue that the setting to STAs is performed only for requesting return of BQR and notification of a detailed parameter cannot be performed.

Furthermore, there is an issue that, in BQR Control Subfield standardized in IEEE 802.11ax, only short information can be returned, and only about 8 pieces of available channel information can be continuously transmitted.

Moreover, channel availability determination is made on the basis of a detection result of clear channel assessment (CCA). For this reason, there is an issue that, even in a state where a network allocation vector (NAV) is set at the time of receiving a signal from an OBSS STA in advance, it is determined that a channel is available if a signal is not actually detected, and in a case where the channel is allocated from an access point, the NAV is actually set and transmission cannot be performed.

Issues in establishing multi-user communication in multi-link operation will be summarized.

First, there is an issue that, in a case where a communication device on the transmission side acquires a transmission right, links available to each of other communication devices on the transmission side cannot be grasped at that time. That is, in a case where the communication device on the transmission side acquires a transmission opportunity (TXOP) on all links or a plurality of links and data transmission is performed without the usage statuses of these links in other communication devices on the transmission side being grasped, a communication device on the reception side cannot correctly receive the data.

Furthermore, since it is difficult for a device of Enhanced Single Radio to operate on a plurality of links, there is an issue that reception cannot be simultaneously performed on a plurality of links in multi-link operation. Therefore, in Enhanced Single Radio, an available link needs to be preferentially caused to be used.

Therefore, at the time of multi-link operation, each of a plurality of communication devices on the transmission side needs to determine to which link data addressed to the common communication device on the reception side is to be allocated and transmitted according to a transmission opportunity (TXOP) status on a link available to each of the plurality of communication devices on the transmission side that are multi-users.

Subsequently, according to the present disclosure, a method will be described in which, in a case of performing multi-user communication in multi-link operation, an access point exchanges information indicating a link in multi-links on which the RXOP is acquired and transmission can be performed by a plurality of communication terminals that are on the uplink transmission side at that time.

Uplink multi-user communication by multi-link operation (MLO) from a plurality of communication terminals (STAs) to an access point (AP) that is the same connection destination is performed by the following procedure.

(1) The AP transmits MU-MLO Trigger Request to each of the STAs on the transmission side on a link on which reception can be performed.

(2) Each of the STAs returns MU-MLO Request Response including TXOP information on multi-links to the AP.

(3) The AP sets an uplink resource to be used for transmission for each of the STAs from the TXOP information received from each of the STAs on the transmission side.

(4) The AP notifies the STAs that perform MU-MLO of uplink links used by MU MLO Allocation.

(5) Urgent data and Allocation for random access transmission are set in some multi-links.

(6) Upon receiving the MU-MLO Allocation from the AP, the STAs performs uplink transmission on multi-links allocated to the STAs.

(7) The STAs can perform continuous transmission including RXOP information indicating availability in the transmission data (optional).

(8) The AP performs reception according to the MU MLO Allocation, and returns Block Ack for each of the STAs according to a reception status.

(9) In a case where retransmission is necessary, the AP may designate retransmission of undelivered data in the next Allocation.

Furthermore, uplink MLO may be repeatedly performed over time during which the AP obtains RXOP and operation of (1) to (9) described above is performed. In addition, in a case where reverse direction, that is, downlink data transmission is required, the AP may continue to allocate parameters for downlink multi-user communication, or may allocate new parameters.

B. Network Configuration

Figure 1:
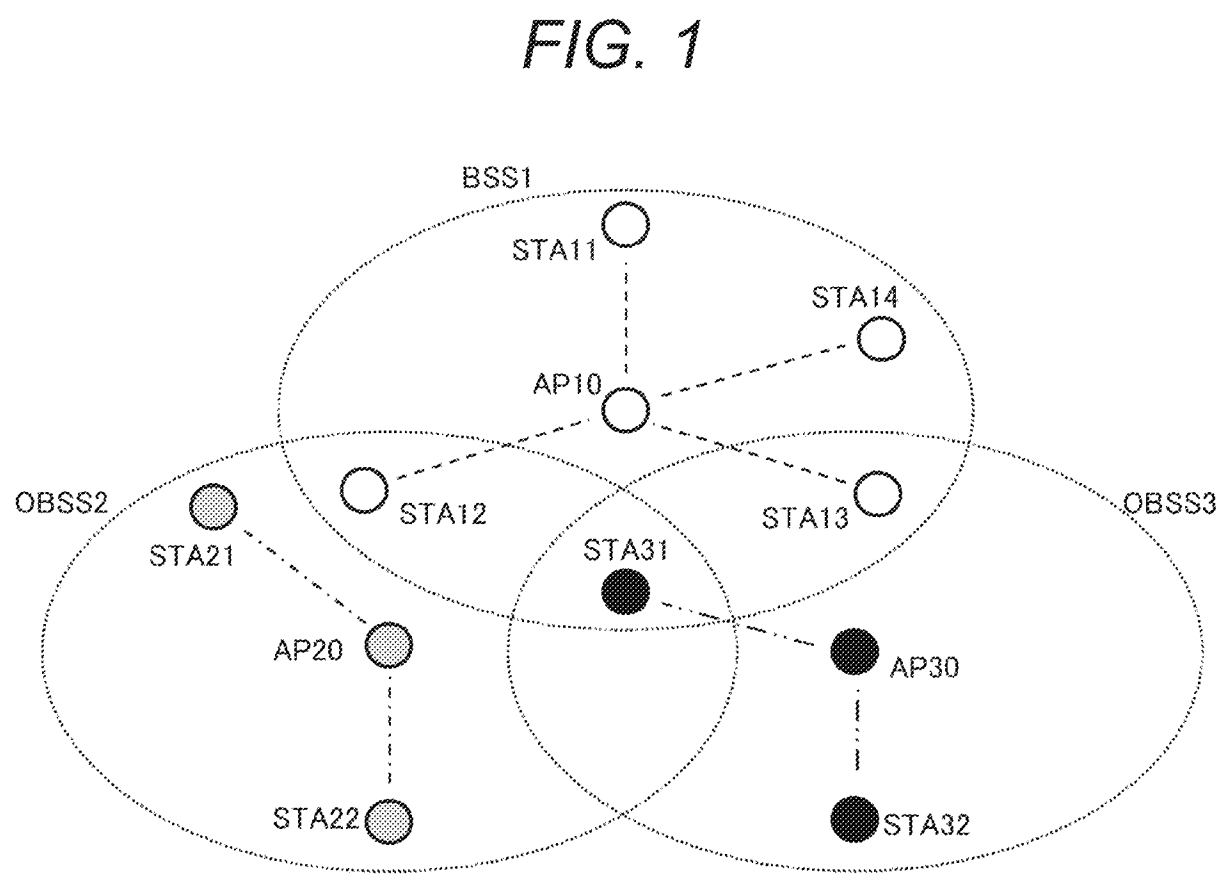

FIG. 1 illustrates states of networks of a wireless LAN system to which the present disclosure is applied. In the illustrated example, a plurality of communication terminals (STAs 11 to 14) is connected to a Basic Service Set 1 (BBS 1) that is a network operated by an access point (AP 10).

Furthermore, another BBS (OBSS) exists in the neighborhood of the BBS1 in an overlapping manner. In the example illustrated in FIG. 1, there are an OBSS 2 operated by an AP 20 and an OBSS 3 operated by an AP 30. Then, an STA 21 and an STA 22 are connected to the OBSS 2, and an STA 31 and an STA 32 are connected to the OBSS 3.

Note that, in FIG. 1, radio wave coverage of each access point AP 10, AP20, and AP 30 is indicated by an ellipse drawn using a dotted line, and this indicates the range of each network.

In the states of networks illustrated in FIG. 1, the STA 12 can grasp a signal from the AP 20 of the BSS 2, and the STA 13 can grasp a signal from the AP 30 of the BSS 3. Therefore, in the BSS 1, a network configuration is adopted in which interference is received or given from or to each other in a case where the same link is used by a signal from each adjacent OBSS.

In the present embodiment, for example, it is assumed that multi-link operation is performed in the BBS 1. Furthermore, it is assumed that the multi-link operation is performed even in an environment in which an EMLMR device and an EMLSR device are mixed in the BBS1.

FIG. 2 illustrates an example of frequency bands and channel allocation used in the wireless LAN system to which the present disclosure is applied. In the drawing, an example of channel allocation on each of the frequency bands of a 2.4 GHz band, a 5 GHz band, and a 6 GHz band that available to the wireless LAN is illustrated. In each of the frequency bands, the horizontal axis is a frequency axis.

In the 2.4 GHz band, in a case of applying to a wireless signal of an orthogonal frequency division multiplexing (OFDM) method with a 20 MHz bandwidth in the IEEE 802.11g standard, frequencies for at least two channels are set.

Furthermore, in the 5 GHz band, a plurality of channels to be applied to a wireless signal of the OFDM method with the 20 MHz bandwidth can be secured for a standard of IEEE 802.11a and the like. However, operation in the 5 GHz band is provided with conditions for determining an available frequency range, transmission power, and transmission possibility by the legal systems of respective countries. In the 5 GHz band, channel numbers are assigned along the horizontal axis. In Japan, 8 channels from a channel 36 to a channel 64 and 11 channels from a channel 100 to a channel 140 can be used. Note that, in other countries and regions, a channel 32, a channel 68, a channel 96, and a channel 144 can also be used, and further, in the frequency band thereabove, channels 149 to 173 can be used.

Furthermore, standardization is currently in progress so that the 6 GHz band can also be used. According to the standard content, 25 channels can be arranged in the UNII-5 band of the 6 GHz band A, five channels can be arranged in the UNII-6 band of the 6 GHz band B, 17 channels can be arranged in the UNII-7 band of the 6 GHz band C, and 12 channels can be arranged in the UNII-8 band of the 6 GHz band D.

In the multi-link operation described in this specification, one link is formed by one or a combination of two or more channels in the channel configuration illustrated in FIG. 2. Furthermore, one link may be formed by two or more channels that are continuous on the frequency axis, or one link may be formed by two or more channels that are not continuous on the frequency axis.

C. Uplink Multi-User Multiplex Communication Applied to MLO

FIG. 3 illustrates an example in which uplink multi-user multiplex communication (UL MU) is applied to the MLO. FIG. 3 illustrates data transmission and reception states viewed from the viewpoint of the AP in a case where uplink multi-user multiplex communication is performed on each link of links 1 to 4 in order from the top. Provided that the horizontal axes are assumed as the time axes, data transmission and reception states of the links 1 to 4 are illustrated. In each of the time axes, a state of upward protrusion represents a state in which the AP performs transmission operation on the corresponding link, and a state of downward protrusion represents a state in which the AP performs reception operation on the corresponding link.

The AP transmits Trigger Request (TR) to each of the STAs in which data in which the AP is a sending destination exists on all available links. In a case where all the links are available and RXOP has been able to be acquired, the AP transmits TR using the links 1 to 4, but may transmit TR only on a link that has gotten available at that time.

On the other hand, each of the STAs receives the TR from the AP on all the available links. The STAs return Request Response (RR) if the links on which the TR is received are available. The AP receives the RR from the STAs on each of the links.

Here, on a link on which a signal from an adjacent OBSS is detected or a link on which an NAV of the OBSS is set, the STAs do not return RR on the link so as not to interfere with communication of the OBSS. That is, the STAs transmit RR including information indicating that TXOP on the links is obtained.

Note that the STAs may return RR on all available links as long as the devices are EMLMR devices. On the other hand, if the STAs are EMLSR devices, the STAs may return RR only on links on which the STAs perform reception operation. That is, resources for returning RR are allocated to STAs required to perform returning. For example, a plurality of STAs may return RR using a mechanism of uplink multi-user multiplex communication.

The AP can grasp available links capable of multi-user multiplex communication for each of the STAs according to the reception status of the RR returned from each of the STAs. Then, the AP transmits Allocation (AL) to each of the STAs to notify each of the STAs in advance of links to be used for uplink multiplex communication. If the STAs can receive the AL from the AP, the STAs can transmit multi-user multiplexed data to the AP on the designated links on the basis of the information.

In this way, the AP can receive data from each of the STAs by uplink multi-user multiplex communication.

In the example illustrated in FIG. 3, the AP receives Uplink User Data 1 and Uplink User Data 2 on the link 1, Uplink User Data 3 and Uplink User Data 4 on the link 2, Uplink User Data 5 and Downlink User Data 6 on the link 3, and Uplink User Data 7 and Uplink User Data 8 on the link 4.

Moreover, in a case of receiving data by the uplink multi-user multiplex communication, the AP returns BA to each of the STAs as necessary. At that time, the AP may return BA on each of the links using a method of Multi-STA Block ACK using, for example, a mechanism of downlink multi-user multiplex communication.

The AP may return BA including RXOP information indicating that reception can be continuously performed thereafter on the links. Alternatively, the AP may transmit the BA and next AL at the same time, or may transmit AL including the resource in a case where retransmission is necessary.

Furthermore, in a case where there is a remaining time in the RXOP in each of the links, the AP may transmit AL to each of the STAs again, or may not transmit the AL. Then, for example, in a case where there is undelivered data on each of the links, or the like, the AP causes a corresponding STA to perform uplink multi-user communication as necessary. Moreover, after uplink multi-user communication is performed, the AP returns BA to each of the STAs.

In the example illustrated in FIG. 3, the AP receives Uplink User Data 9 and Uplink User Data 10 on the link 1, Uplink User Data 11 and Uplink User Data 12 on the link 2, Uplink User Data 13 and Downlink User Data 14 on the link 3, and Uplink User Data 15 and Uplink User Data 16 on the link 4, and further returns BA on the links 1 to 4.

FIG. 3 illustrates an example in which such a series of operation is simultaneously performed on each of the links, but may be performed asynchronously in each of the links.

Figure 4:
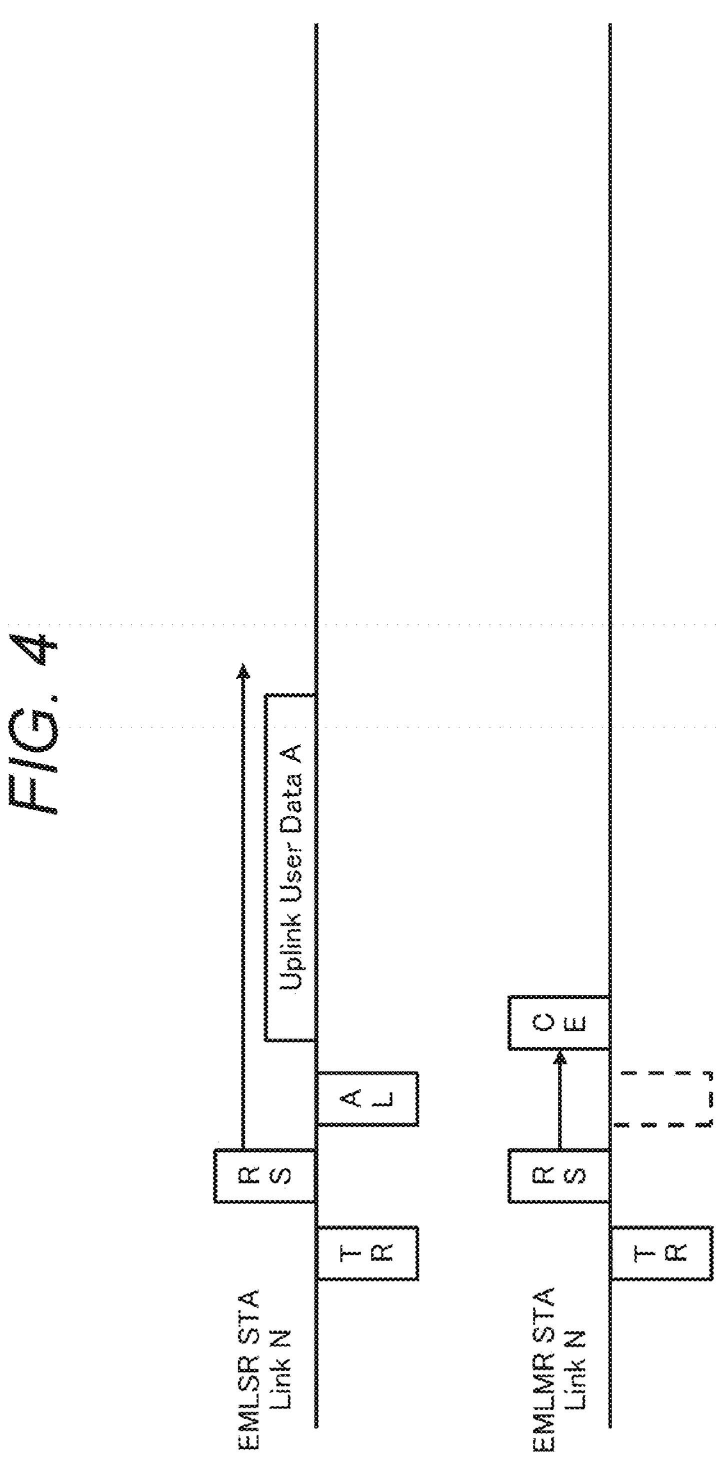
FIG. 4 is a diagram illustrating a modification in which uplink multi-user multiplex communication is applied to the MLO.

FIG. 4 illustrates a modification in which uplink multi-user multiplex communication (UL MU) is applied to the MLO. In FIG. 4, in a case where uplink multi-user multiplex communication is performed, Resuest To Send: RTS (RS) is transmitted and communication is reliably performed. In this case, a state of data transmission and reception viewed from the viewpoint of each of devices (STAs) of EMLSR and EMLMR that are on the data transmission side is illustrated. Provided that the horizontal axes are assumed as the time axes, a state of upward protrusion on the same time axis represents a state in which the STAs of EMLSR and EMLMR perform transmission operation on the corresponding link, and a state of downward protrusion represents a state in which the STAs of EMLSR and EMLMR perform reception operation on the corresponding link.

The EMLSR STA returns, upon receiving a TR signal from the AP, Request to Send: RTS (RS) to clearly indicate that the EMLSR STA performs transmission operation on the link instead of RR. In this case, the EMLSR STA can inform devices of an overlapping network (OBSS) that setting of an NAV is performed by clearly returning the RS.

The example illustrated in FIG. 4 illustrates a state in which the EMLSR STA has transmitted Uplink Multi-User Data A to the AP on a link N designated by AL from the AP. Further, thereafter, for example, in a case where retransmission is necessary, the EMLSR STA can continuously use the link by receiving AL in which a resource for retransmission is described at the time of returning BA from the AP.

Similarly, the EMLMR STA is formed to return, upon receiving a TR signal from the AP, RS to clearly indicate that the EMLMR STA performs transmission operation on the link instead of RR. In this case, since TXOP can be set on other links in a case of the EMLMR STA, a resource is not necessarily allocated on the link on which the RS has been returned. In a case where AL in which multi-user multiplex communication is performed is not received from the AP on the link, or in a case where communication of the STA is not included in the AL, the STA of EMLMR may transmit Contention Free End (CF-End: CE) indicating that the setting of the NAV is released by the RS.

Note that, also for RS from the EMLSR STA, in a case where AL in which multi-user multiplex communication is performed is not received from the AP on the link, or in a case where communication of the EMLSR STA is not included in the AL, the EMLSR STA may transmit a CE frame corresponding to CF-End indicating that communication is ended.

Figure 5:
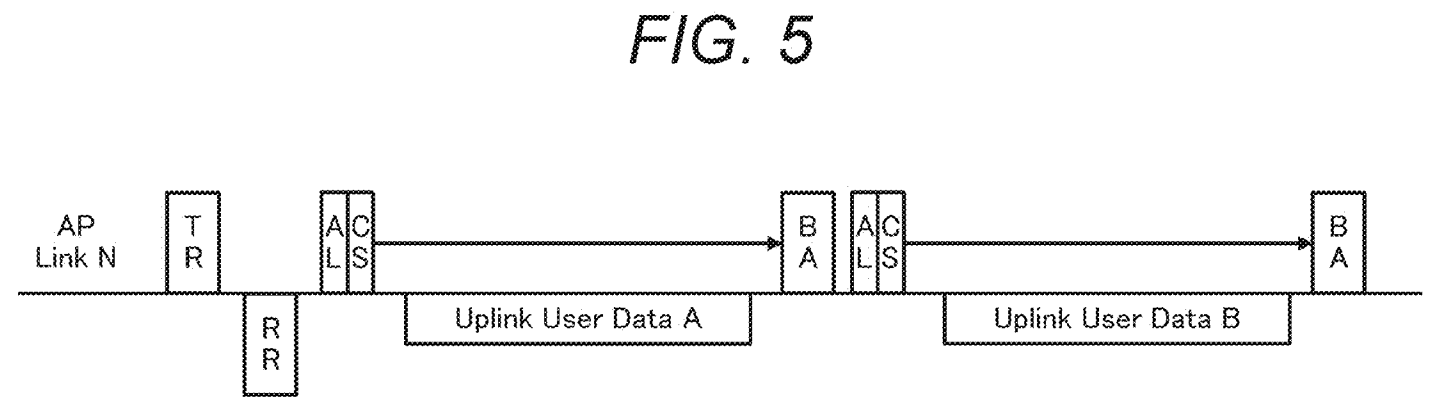

FIG. 5 illustrates another modification in which uplink multi-user multiplex communication (UL MU) is applied to the MLO. FIG. 5 illustrates a state of data transmission and reception from the viewpoint of the AP after the AP transmits a TR signal on the link N. Provided that the horizontal axis is assumed as the time axis, a state of upward protrusion on the same time axis represents a state in which the AP performs transmission operation on the link N, and a state of downward protrusion represents a state in which the AP performs reception operation on the link N.

Upon receiving RR returned from the STAs after transmitting TR, the AP. The point that the AL designating a link of the uplink multi-user multiplex communication is transmitted is similar to the above. By further transmitting Clear to Send: CTS (CS) after transmitting the AL, the AP can notify devices of the OBSS that an NAV is set while indicating that reception operation is to be performed thereafter. As a result, the AP can reliably perform reception of uplink multi-user communication.

In the example illustrated in FIG. 5, upon receiving the Uplink User Date A transmitted by the STAs (not illustrated) on the link N designated by the AL, the AP returns BA on the link N. Then, since there is a remaining time in RXOP in the link N, the AP further transmits CS after transmitting AL, then receives Uplink User Date B from the STAs (not illustrated) on the link N, and returns BA.

Figure 6:
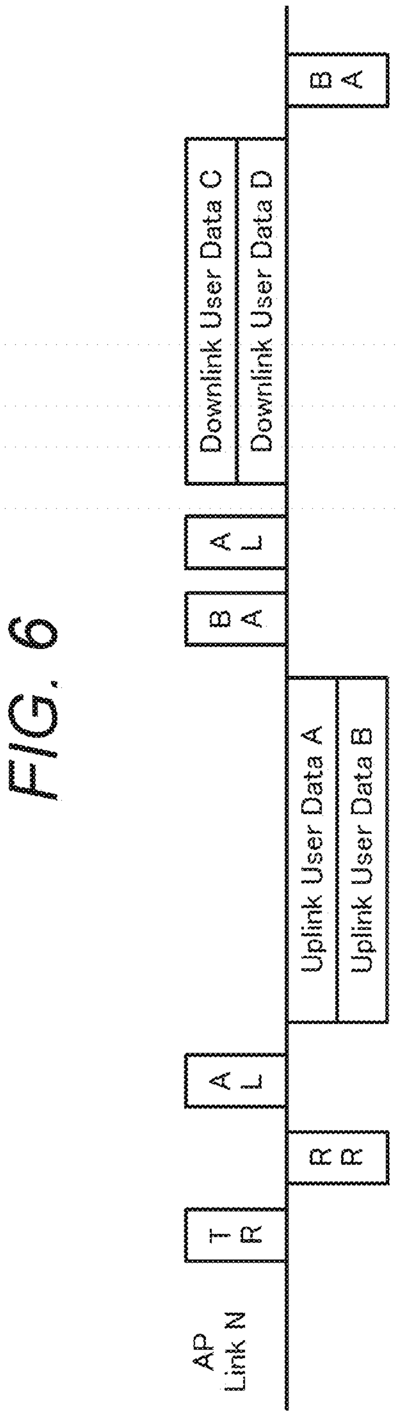
FIG. 6 is a diagram illustrating an example in which downlink multi-user multiplex communication is performed after uplink multi-user multiplex communication.

FIG. 6 illustrates an example in which downlink multi-user multiplex communication (DL MU) is performed after uplink multi-user multiplex communication (UL MU). FIG. 6 illustrates a state of data transmission and reception from the viewpoint of the AP after the AP transmits a TR signal on the link N. Provided that the horizontal axis is assumed as the time axis, a state of upward protrusion on the same time axis represents a state in which the AP performs transmission operation on the corresponding link, and a state of downward protrusion represents a state in which the AP performs reception operation on the corresponding link.

On a link on which TR has been transmitted, RR is returned from the transmission destination STA to the AP. Then, the AP transmits AL according to the reception status of the RR returned from each of the STAs, and then can receive data from each of the STAs by uplink multi-user multiplex communication (the same as above). In the example illustrated in FIG. 6, the Uplink User Data A and the Uplink User Data B are performed as uplink multi-user multiplex communication from the STAs (not illustrated) on the link N, and the AP receives these pieces of data and returns BA.

Thereafter, downlink multi-user multiplex communication (DL MU) from the AP to the STAs is performed on link N. That is, the AP performs transmission of Downlink User Data C and Downlink User Data D after transmitting the AL on the link N. Note that the AP may cause the STAs on the reception side to return BA after the downlink multi-user multiplex communication, and the AP receives the BA.

D. Usage Detection Statuses of Multi-Links in AP and STA

Figure 7:
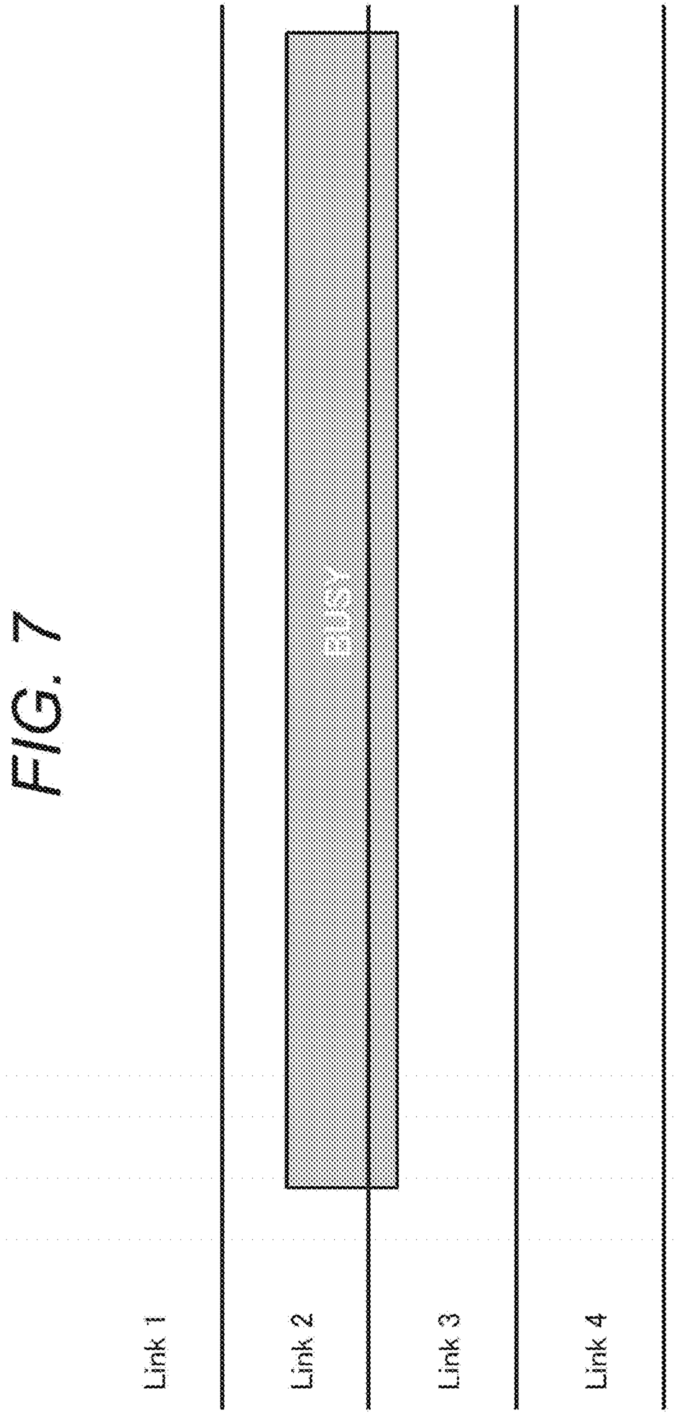
FIG. 7 is a diagram illustrating an example of a usage detection status of multi-links in an AP 10.

FIG. 7 illustrates an example of usage detection statuses of the multi-links in the AP 10 of the wireless LAN system illustrated in FIG. 1. In the example illustrated in FIG. 7, in a case where the AP 10 intends to perform the MLO using the links 1 to 4, only the link 2 cannot be used since a signal from another network is detected, and is in a Busy state.

Figure 8:
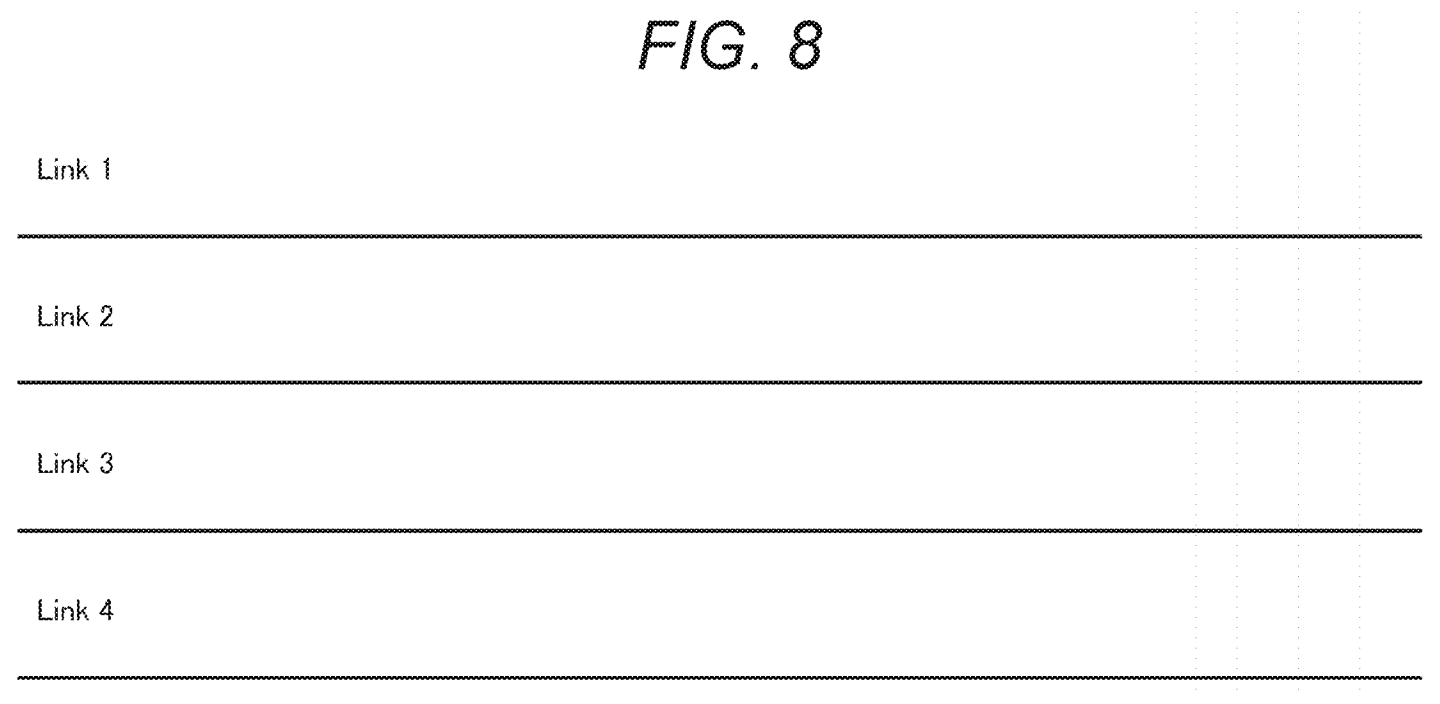

FIG. 8 illustrates an example of usage detection statuses of the multi-links in the STA 11 subordinate to the AP 10. In the example illustrated in FIG. 8, in a case where the STA 11 intends to perform the MLO using the links 1 to 4, all the links can be used since a signal from another network is not detected.

Figure 9:
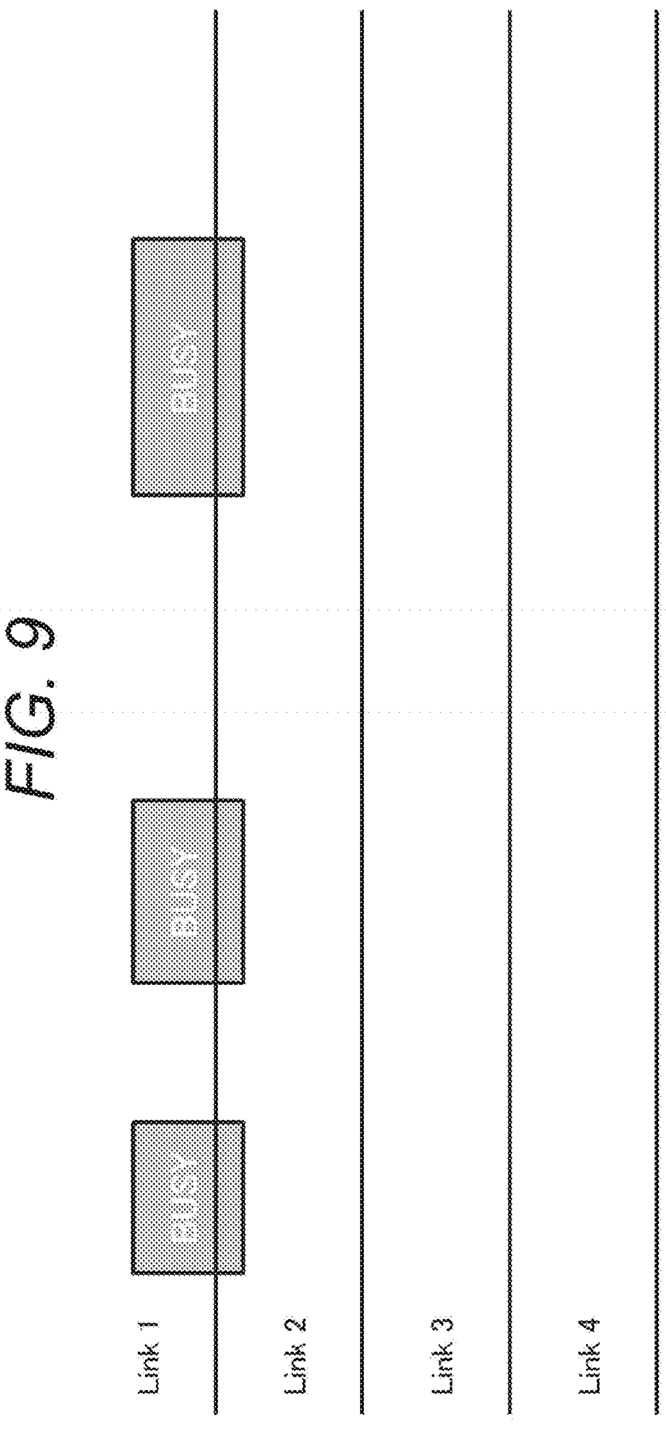
FIG. 9 is a diagram illustrating an example of a usage detection status of the multi-links in an STA 12 subordinate to the AP 10.

FIG. 9 illustrates an example of usage detection statuses of the multi-links in the STA 12 subordinate to the AP 10. In the example illustrated in FIG. 9, in a case where the STA 12 intends to perform the MLO using the links 1 to 4, the link 1 cannot be used since a signal from another network is detected intermittently, and is in a Busy state.

Figure 10:
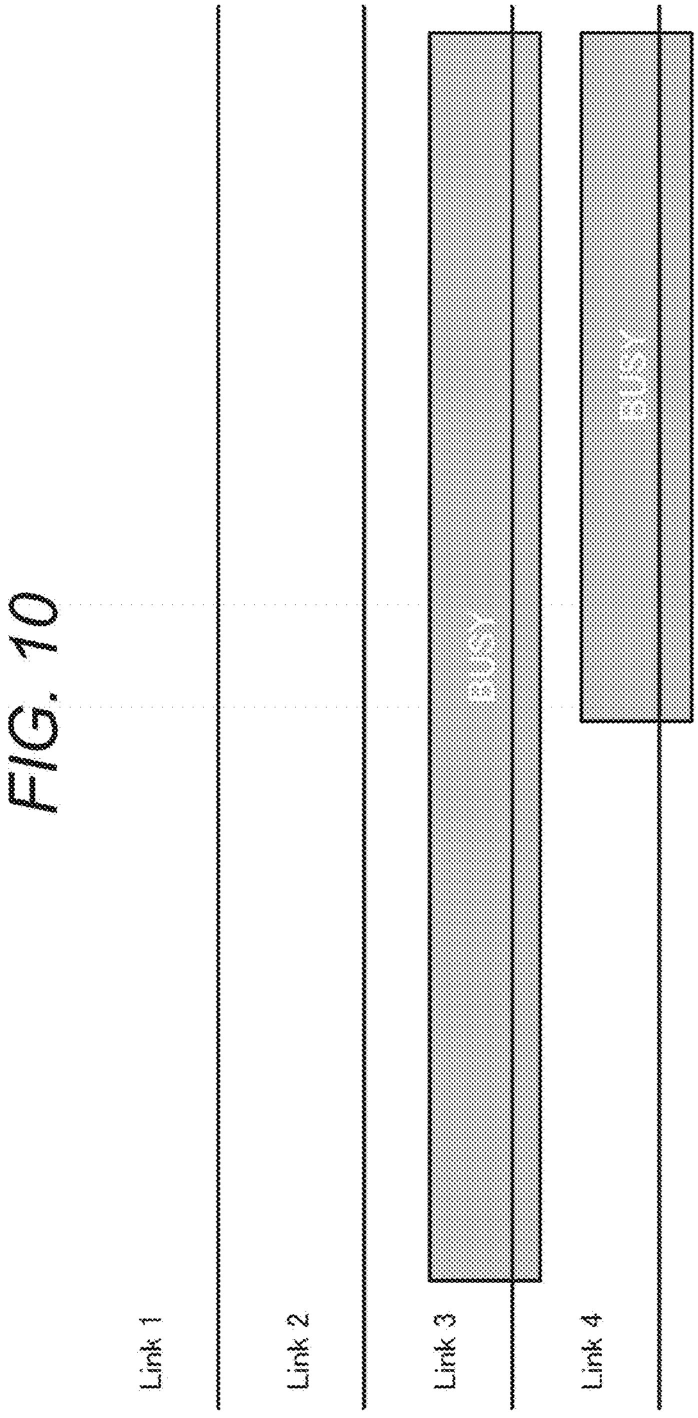
FIG. 10 is a diagram illustrating an example of a usage detection status of the multi-links in an STA 13 subordinate to the AP 10.

FIG. 10 illustrates an example of usage detection statuses of the multi-links in the STA 13 subordinate to the AP 10. In the example illustrated in FIG. 10, in a case where the STA 13 intends to perform the MLO using the links 1 to 4, the links 3 and 4 cannot be used since a signal from another network is detected, and are in a Busy state. Specifically, the STA 13 first detects a signal from another network on the link 3 that then enters a Busy state, and thereafter, detects a signal from another network also on the link 3 that then enters a Busy state.

Figure 11:
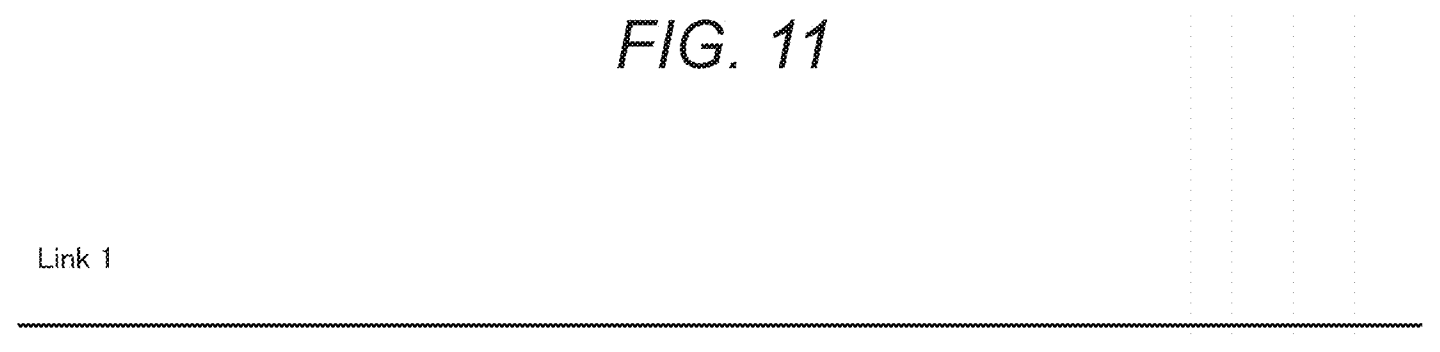

FIG. 11 illustrates an example of usage detection statuses of the multi-links in the STA 14 subordinate to the AP 10. In the example illustrated in FIG. 11, the STA 14 operates as an EMLSR device, and is in a state of setting TXOP of data using only the link 1 among the links 1 to 4.

As illustrated in FIGS. 7 to 11, a case where the AP and each of the STAs subordinate thereto each have different available links, in other words, a case where performing multi-link operation using all the links is difficult is assumed. Furthermore, a case where an EMLSR device is included in the STAs subordinate to the AP is assumed.

E. Implementation Example in which Uplink Multi-User Communication is Applied to Multi-Links FIG. 12 illustrates an implementation example in which uplink multi-user communication is applied to multi-links in the AP 10 of the wireless LAN system illustrated in FIG. 1. Here, operation is illustrated in which a case where the AP 10 applies uplink multi-user communication as illustrated in FIG. 3 under the usage detection statuses of the multi-links illustrated in FIG. 7 is assumed. Provided that the horizontal axes are assumed as the time axes, data transmission and reception states of the links 1 to 4 are illustrated. In each of the time axes, a state of upward protrusion represents a state in which the AP 10 performs transmission operation on the corresponding link, and a state of downward protrusion represents a state in which the AP 10 performs reception operation on the corresponding link.

The AP 10 cannot perform UL MU communication since a signal from the OBSS is detected on the link 2 that then enters a Busy state. Therefore, the AP 10 transmits TR to the STAs 11 to 14 in which data in which the AP 10 is a sending destination exists on links 1, 3, and 4, and starts a series of operation of UL MU communication.

On the other hand, the STAs 11 to 14 that are on the data transmission side receive the TR from the AP 10 on the links 1, 3, and 4. The STAs 11 to 14 return RR including TXOP information at that time to the AP 10 on the links 1, 3, and 4.

The AP 10 can grasp links that are capable of multi-user multiplex communication and available to each of the STAs 11 to 14 according to the transmission statuses of the RR returned from the STAs 11 to 14. Then, the AP 10 transmits AL to the STAs 11 to 14 on the links 1, 3, and 4 to notify the STAs 11 to 14 in advance of links to be used for UL MU.

Next, the STAs 11 to 14 each perform UL MU communication addressed to the AP 10 on each of the links 1, 3, and 4 on the basis of the AL received from the AP 10, and the AP 10 receives the UL MU communication. Specifically, the AP 10 receives the Uplink User Data 1 and the Uplink User Data 2 on the link 1, receives the Uplink User Data 5 and the Uplink User Data 6 on the link 3, and receives the Uplink User Data 7 and the Uplink User Data 8 on the link 4.

Then, the AP 10 can collect User Data from the STAs 11 to 14 and check whether there is undelivered data that requires retransmission, and returns BA to the STAs 11 to 14 as necessary. Furthermore, in a case where there is data that needs to be retransmitted, the AP 10 can request retransmission by transmitting AL again and designating a resource necessary for transmitting the retransmission data.

In a case where there is a remaining time in the RXOP in each of the links 1, 3, and 4, the AP 10 can transmit AL to the STAs 11 to 14 again. Also in the example illustrated in FIG. 12, the AL is transmitted again to the STAs 11 to 14 on the links 1, 3, and 4, the STAs 11 to 14 each perform UL MU communication addressed to the AP 10 on each of the links 1, 3, and 4 on the basis of the AL received from the AP 10, and the AP 10 receives the UL MU communication. Specifically, the AP 10 receives the Uplink User Data 9 and the Uplink User Data 10 on the link 1, receives the Uplink User Data 13 and the Uplink User Data 14 on the link 3, and receives the Uplink User Data 15 and the Uplink User Data 16 on the link 4. Note that, in the example illustrated in FIG. 12, data transmission is performed on all available links, but data transmission may be performed using only some of the links depending on the amount of the data.

Then, similar to the above, the AP 10 collects User Data from the STAs 11 to 14, checks whether there is undelivered data that requires retransmission, and returns BA to the STAs 11 to 14 as necessary. Then, in a case where there is no remaining time in the RXOP in each of the links 1, 3, and 4, the AP 10 temporarily ends a series of operation related to the UL MU communication applied to the multi-links.

FIG. 13 illustrates an implementation example in which uplink multi-user communication is applied to the multi-links in the STA 11 subordinate to the AP 10. Here, operation is illustrated in which a case where the STA 11 applies uplink multi-user communication as illustrated in FIG. 3 under the usage detection statuses of the multi-links illustrated in FIG. 8 is assumed. Provided that the horizontal axes are assumed as the time axes, data transmission and reception states of the links 1 to 4 are illustrated. In each of the time axes, a state of upward protrusion represents a state in which the STA 11 performs transmission operation on the corresponding link, and a state of downward protrusion represents a state in which the SAT 11 performs reception operation on the corresponding link.

Since the STA 11 has not detected a signal from the OBSS on all of the links 1 to 4, the STA 11 receives TR from the AP 10 on the links 1, 3, and 4, and starts a series of operation of UL MU communication.

Then, the STA 11 returns RR including TXOP information at that time to the AP 10 on the links 1, 3, and 4. Since there is a possibility that UL MU communication is performed thereafter on the links 1, 3, and 4 on which the RR has been returned, the STA 11 waits for AL from the AP 10 on all these links.

Thereafter, the STA 11 receives AL from the AP 10 on the links 1, 3, and 4. In the example illustrated in FIG. 13, since a resource for UL MU communication is allocated to the STA 11 by AL of the link 3, the STA 11 transmits data of UL MU communication addressed to the AP 10 (Uplink User Data 6) on the link 3.

Next, the STA 11 receives BA in which the data reception statuses are described from the AP 10.

In a case where the AP 10 has a remaining time in RXOP in each of the links 1, 3, and 4, there is a possibility that UL MU communication is performed thereafter. Therefore, the STA 11 waits for AL from the AP 10 on each of the links 1, 3, and 4.

Then, in a case where the STA 11 receives AL from the AP 10 again on any of the links 1, 3, and 4, the STA 11 confirms the description content of the AL and transmits data of UL MU communication using the link in a case where resource allocation of the STA 11 is included. In the example illustrated in FIG. 13, since a resource for UL MU communication is allocated to the STA 11 by AL of the links 3 and 4, the STA 11 transmits data of UL MU communication addressed to the AP 10 (Uplink User Data 14, Uplink User Data 16) on the links 3 and 4.

Then, the STA 11 receives BA from the AP 10 in which the data reception statuses on the links 3 and 4 are described.

Figure 14:
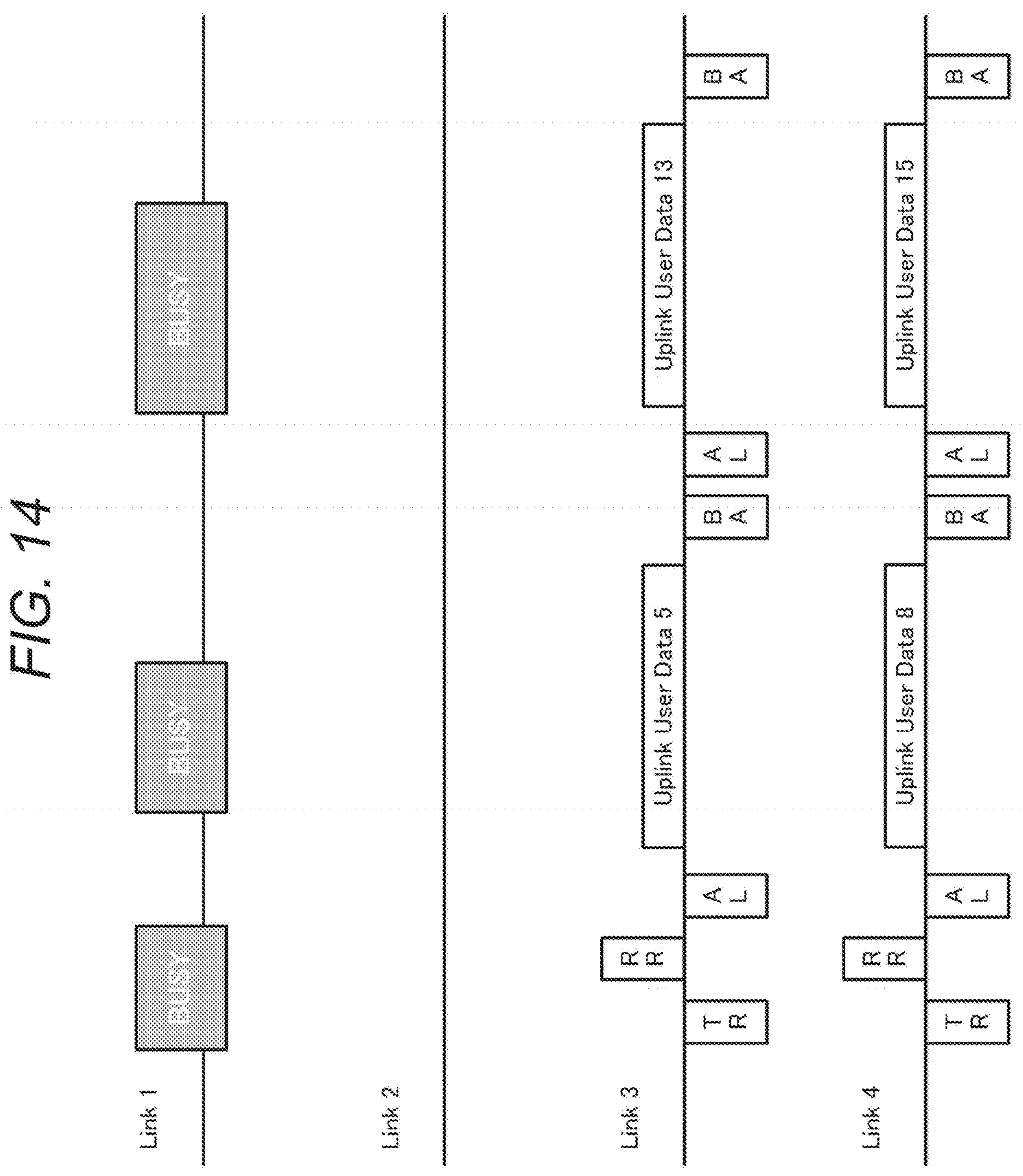
FIG. 14 is a diagram illustrating an implementation example in which uplink multi-user communication is applied to the multi-links in the STA 12 subordinate to the AP 10.

FIG. 14 illustrates an implementation example in which uplink multi-user communication is applied to the multi-links in the STA 12 subordinate to the AP 10. Here, operation is illustrated in which a case where the STA 12 applies uplink multi-user communication as illustrated in FIG. 3 under the usage detection statuses of the multi-links illustrated in FIG. 9 is assumed. Provided that the horizontal axes are assumed as the time axes, data transmission and reception states of the links 1 to 4 are illustrated. In each of the time axes, a state of upward protrusion represents a state in which the STA 12 performs transmission operation on the corresponding link, and a state of downward protrusion represents a state in which the STA 12 performs reception operation on the corresponding link.

Since the STA 12 has detected a signal from the OBSS on the link 1, the STA 12 receives TR from the AP 10 on the links 3 and 4, and starts a series of operation of UL MU communication. Then, the STA 12 returns RR including TXOP information at that time to the AP 10 on the links 3 and 4. Since there is a possibility that UL MU communication is performed thereafter on the links 3 and 4 on which the RR has been returned, the STA 12 waits for AL from the AP 10 on these links.

Then, the STA 12 receives AL from the AP 10 on the links 3 and 4. In the example illustrated in FIG. 14, since a resource for UL MU communication is allocated to the STA 12 by AL of the links 3 and 4, the STA 12 transmits data of UL MU communication addressed to the AP 10 (Uplink User Data 5) on the link 3 and transmits data of DL MU communication addressed to the AP 10 (Uplink User Data 8) on the link 4.

Thereafter, the STA 12 receives BA in which the data reception statuses are described from the AP 10. The AP 10 returns BA on the links 3 and 4 on which the data has been received, but may return BA on another link and the STA 12 may receive the BA as necessary.

In a case where the AP 10 has a remaining time in RXOP in each of the links 3 and 4, there is a possibility that UL MU communication is performed thereafter. Therefore, the STA 12 may be formed to wait for AL on each of the links 3 and 4.

Then, in a case where the STA 12 receives AL from the AP 10 again on any of the links 3 and 4, the STA 12 confirms the description content of the AL and performs data transmission addressed to the AP 10 in a case where a resource of UL MU communication is allocated to the STA 12. In the example illustrated in FIG. 14, since a resource for UL MU communication is allocated to the STA 12 by AL of the links 3 and 4, the STA 12 transmits data of DL MU communication addressed to the AP 10 (Uplink User Data 13, Uplink User Data 15) on each of the links 3 and 4.

Then, the STA 12 receives BA from the AP 10 in which the data reception statuses on the links 3 and 4 are described.

Figure 15:
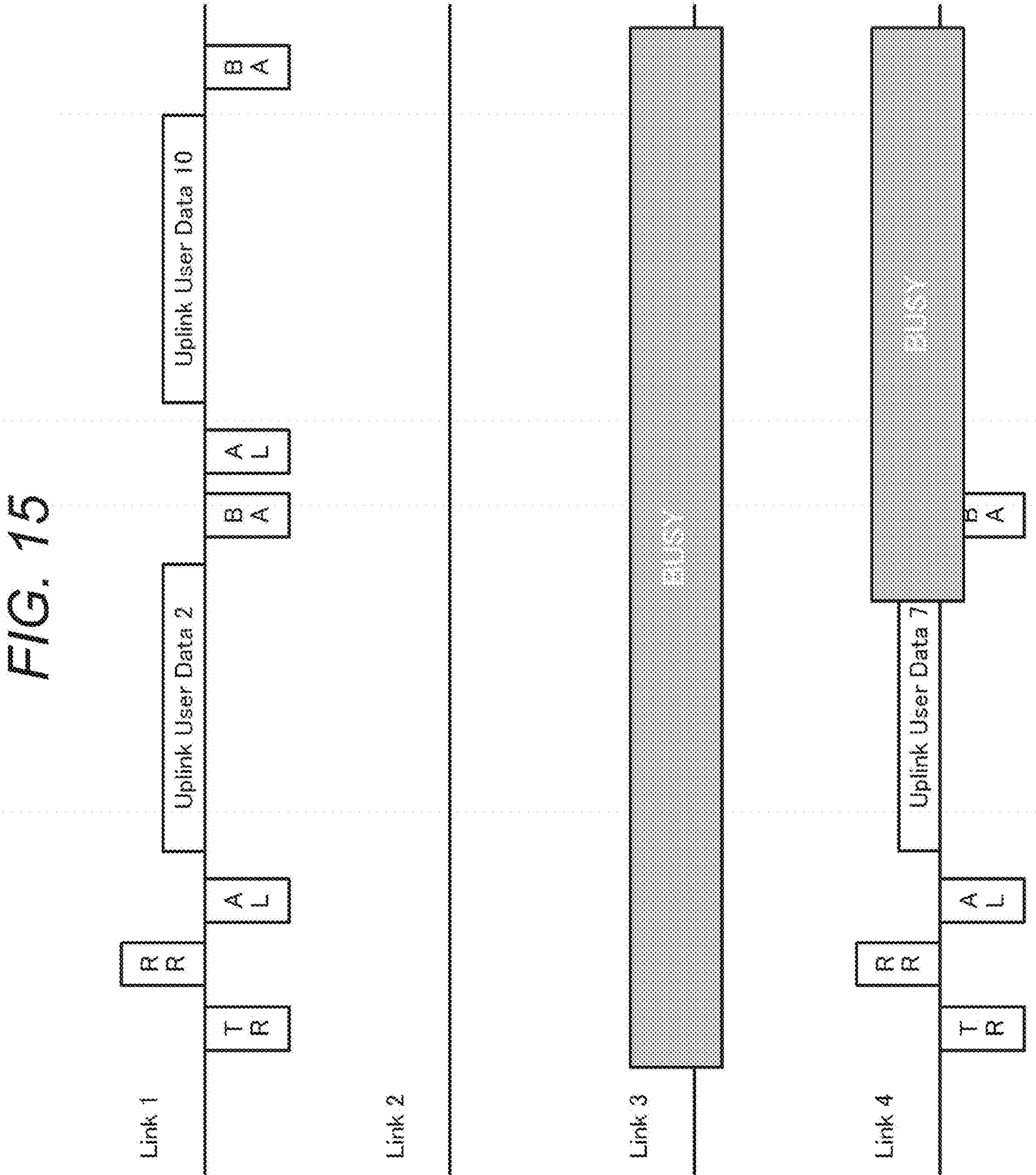
FIG. 15 is a diagram illustrating an implementation example in which uplink multi-user communication is applied to the multi-links in the STA 13 subordinate to the AP 10.

FIG. 15 illustrates an implementation example in which uplink multi-user communication is applied to the multi-links in the STA 13 subordinate to the AP 10. Here, operation is illustrated in which a case where the STA 13 applies uplink multi-user communication as illustrated in FIG. 3 under the usage detection statuses of the multi-links illustrated in FIG. 10 is assumed. Provided that the horizontal axes are assumed as the time axes, data transmission and reception states of the links 1 to 4 are illustrated. In each of the time axes, a state of upward protrusion represents a state in which the STA 13 performs transmission operation on the corresponding link, and a state of downward protrusion represents a state in which the STA 13 performs reception operation on the corresponding link.

Since the STA 13 has detected a signal from the OBSS on the link 3, the STA 13 receives TR from the AP 10 on links 1 and 4, and starts a series of operation of UL MU communication. Then, the STA 13 returns RR including TXOP information at that time to the AP 10 on the links 1 and 4. Since there is a possibility that UL MU communication is performed thereafter on the links 1 and 4 on which the RR has been returned, the STA 13 waits for AL from the AP 10 on these links.

Thereafter, the STA 13 receives AL from the AP 10 on the links 1 and 4. In the example illustrated in FIG. 15, a resource for UL MU communication is allocated to the STA 13 by AL of the links 1 and 4. The STA 13 transmits data of UL MU communication addressed to the AP 10 (Uplink User Data 2) on the link 1 and transmits data of UL MU communication addressed to the AP 10 (Uplink User Data 7) on the link 4.

However, the STA 13 detects a signal from the OBSS while transmitting the Uplink User Data 7 on the link 4, and some data is undelivered. Furthermore, the STA 13 enters a state in which BA cannot be received from the AP 10 on the link 4.

The AP 10 describes BA in which the data reception statuses on the links 1 and 4 are described in BA returned on the link 1, and returns the BA to the STA 13. Therefore, the STA 13 can grasp the reception statuses of the AP 10 on the links 1 and 4 on the basis of the BA received on the link 1.

In a case where the AP 10 has a remaining time in RXOP in each of the links 1 and 4, there is a possibility that retransmission of the undelivered data described above is performed thereafter as UL MU communication. Therefore, the STA 13 waits for AL on all the links.

At this time, since the STA 13 has detected a signal from the OBSS on the links 3 and 4, the STA 13 can receive AL from the AP 10 only on the link 1. Then, upon confirming that a resource addressed to the STA 13 is allocated by the AL received again from the AP 10 on the link 1, the STA 13 transmits, as data of UL MU communication addressed to the AP 10 (Uplink User Data 10) on the link 1, for example, the retransmitted undelivered data of the Uplink User Data 7.

Then, the STA 13 receives BA from the AP 10 in which the data reception status on the link 1 is described.

Figure 16:
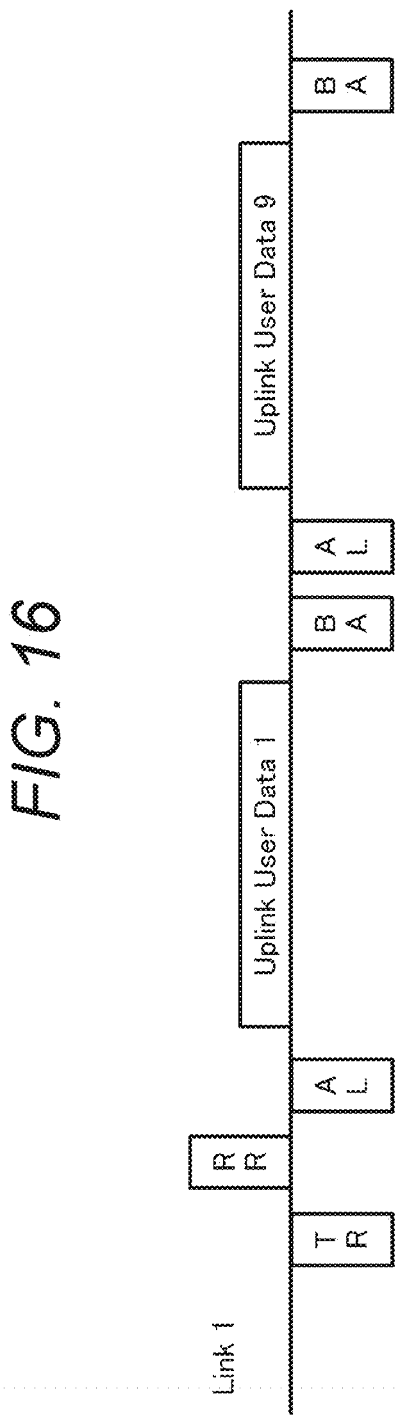
FIG. 16 is a diagram illustrating an implementation example in which uplink multi-user communication is applied to the multi-links in the STA 14 subordinate to the AP 10.

FIG. 16 illustrates an implementation example in which multi-link multi-user communication is applied to the multi-links of an EMLSR device. Here, similarly to the example illustrated in FIG. 11, operation is illustrated in which a case where the STA 14 subordinate to the AP 10 operates as an EMLSR device and is in a state of setting TXOP of data using only the link 1 among the links 1 to 4, and uplink multi-user communication illustrated in FIG. 3 is applied is assumed. The drawing illustrates a state of data transmission and reception of the STA 14 on the link 1 using the horizontal axis as the time axis, and a state of upward protrusion represents a state in which the STA 14 performs transmission operation on the link 1, and a state of downward protrusion represents a state in which the STA 14 performs reception operation on the link 1.

Upon receiving TR from the AP 10 on the link 1, the STA 14 returns RR including TXOP information at that time to the AP 10 on the link 1. Since there is a possibility that UL MU communication is performed thereafter on the link 1 on which the RR has been returned, the STA 14 waits for AL from the AP 10 on the link 1.

Thereafter, the STA 14 receives AL from the AP 10 on the link 1. In the example illustrated in FIG. 16, a resource for UL MU communication is allocated to the STA 14 by AL of the link 1. Therefore, the STA 14 transmits data of UL MU communication addressed to the AP 10 (Uplink User Data 1) on the link 1. Then, the STA 14 receives BA in which the data reception status is described from the AP 10.

Furthermore, in a case where the AP 10 has a remaining time in RXOP in the link 1, there is a possibility that UL MU communication is performed thereafter. Therefore, the STA 14 waits for AL on the link 1.

Then, upon confirming that a source addressed to the STA 14 is allocated by the AL received again from the AP 10 on the link 1, the STA 14 transmits data of UL MU communication addressed to the AP 10 (Uplink User Data 9) on the link 1.

Then, the STA 14 receives BA from the AP 10 in which the data reception status on the link 1 is described.

F. Sequence of Uplink Multi-User Multiplex Communication of Each Link

In this item F, a sequence of uplink multi-user multiplex communication for each of the links in a case where the usage detection status of each of the links as illustrated in FIGS. 7 to 11 is assumed in the AP 10 of the wireless LAN system illustrated in FIG. 1 will be described.

Figure 17:
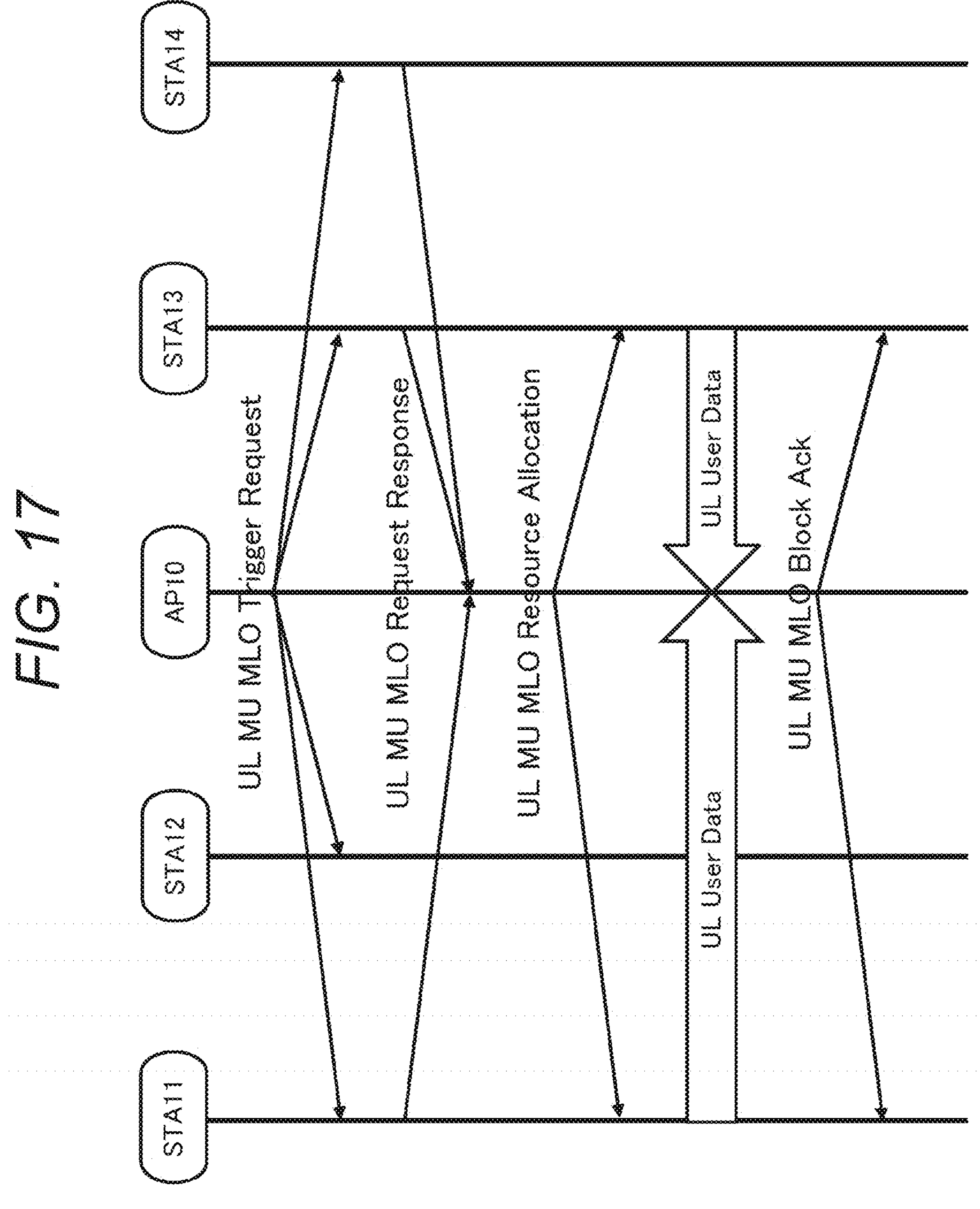
FIG. 17 is a diagram illustrating a sequence example of uplink multi-user multiplex communication on a link 1.

FIG. 17 illustrates a sequence of uplink multi-user multiplex communication on the link 1. In the illustrated sequence, control information and user data are exchanged between the AP 10 and the STAs 11 to 14 subordinate to the AP 10.

First, TR that triggers the start of the MLO to which UL MU communication is applied is transmitted from the AP 10 to the STAs 11 to 14 subordinate to the AP 10.

Next, the STAs 11, 13, and 14 that have been able to receive the TR from the AP 10 return RR in which TXOP information is described to the AP 10.

Here, the AP 10 allocates resources of UL MU communication on the basis of the information of the TXOP of each of the STAs 11, 13, and 14, and transmits AL to the STAs 11 and 13 to be multiplexed on the link 1.

Then, the STAs 11 and 13 each transmit multiplexed data (UL User Data) to the AP 10 on the link 1.

Upon receiving the multiplexed data (UL Data Stream), the AP 10 returns BA in which the reception statuses are described to the STAs 11 and 13 on the link 1.

FIG. 18 illustrates a sequence of uplink multi-user multiplex communication on the link 4. In the illustrated sequence, control information and user data are exchanged between the AP 10 and the STAs 11 to 14 subordinate to the AP 10.

First, TR that triggers the start of the MLO to which UL MU communication is applied is transmitted from the AP 10 to the STAs 11 to 14 subordinate to the AP 10.

Next, the STAs 11 to 13 that have been able to receive the TR from the AP 10 return RR in which TXOP information is described to the AP 10.

Here, the AP 10 allocates resources of UL MU communication on the basis of the information of the TXOP of each of the STAs 11 to 13, and transmits AL to the STAs 12 and 13 to be multiplexed on the link 4.

Then, the AP 10, the STAs 12 and 13 each transmit multiplexed data (UL User Data) to the AP 10 on the link 4.

Upon receiving the multiplexed data (UL User Data) from the STAs 12 and 13, the AP 10 returns BA in which the reception statuses are described to the STAs 12 and 13 on the link 4.

G. Configuration of Wireless Communication Device

Figure 19:
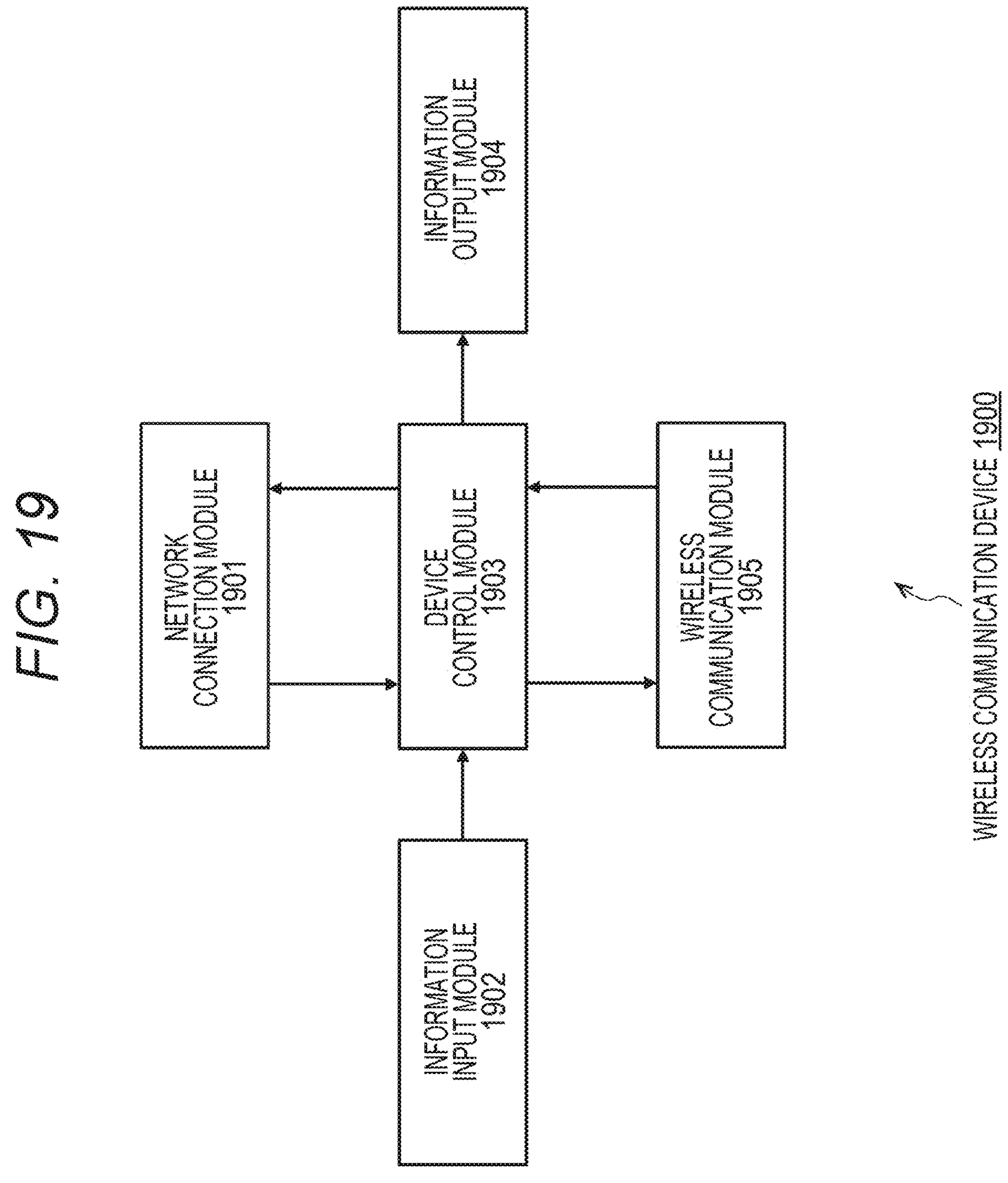
FIG. 19 is a diagram illustrating a functional configuration of a wireless communication device 1900.

FIG. 19 schematically illustrates a functional configuration of a wireless communication device 1900 to which the present disclosure is applied. The illustrated wireless communication device 1900 can operate as an access point (AP) in the wireless LAN system illustrated in FIG. 1, for example. Needless to say, the wireless communication device 1900 may operate as a communication terminal (STA) subordinately to any access point.

The illustrated communication device 1900 includes each functional module of a network connection module 1901, an information input module 1902, a device control module 1903, an information output module 1904, and a wireless communication module 1905. Note that the communication device 1900 may further include other functional modules that are not illustrated, but the modules are not essential to implement the present disclosure and are not illustrated.

For example, in a case where the wireless communication device 1900 operates as an access point, the network connection module 1901 has a configuration in which a function as a communication modem or the like for connecting to a wide-area communication network such as the Internet is mounted. For example, the network connection module 1901 connects a public communication line and the Internet via an Internet service provider.

The information input module 1902 is a module for inputting information indicating an instruction from the user, and includes, for example, a push button, a keyboard, a touch panel, a mouse, and other input devices.

The device control module 1903 corresponds to a portion that performs control to operate a communication device intended by the user as an access point.

The information output module 1904 is a portion that specifically displays an operation state of the wireless communication device 1900 and information obtained via the network, includes, for example, a display element such as a light emitting diode (LED) display, a liquid crystal panel, or an organic electro-luminescence (EL) display, a speaker that outputs voice or music, and the like, and can display and notify the user of necessary information as necessary.

The wireless communication module 1905 is a functional module for processing wireless communication. The present disclosure is basically implemented by a function provided by the wireless communication module 1905.

Figure 20:
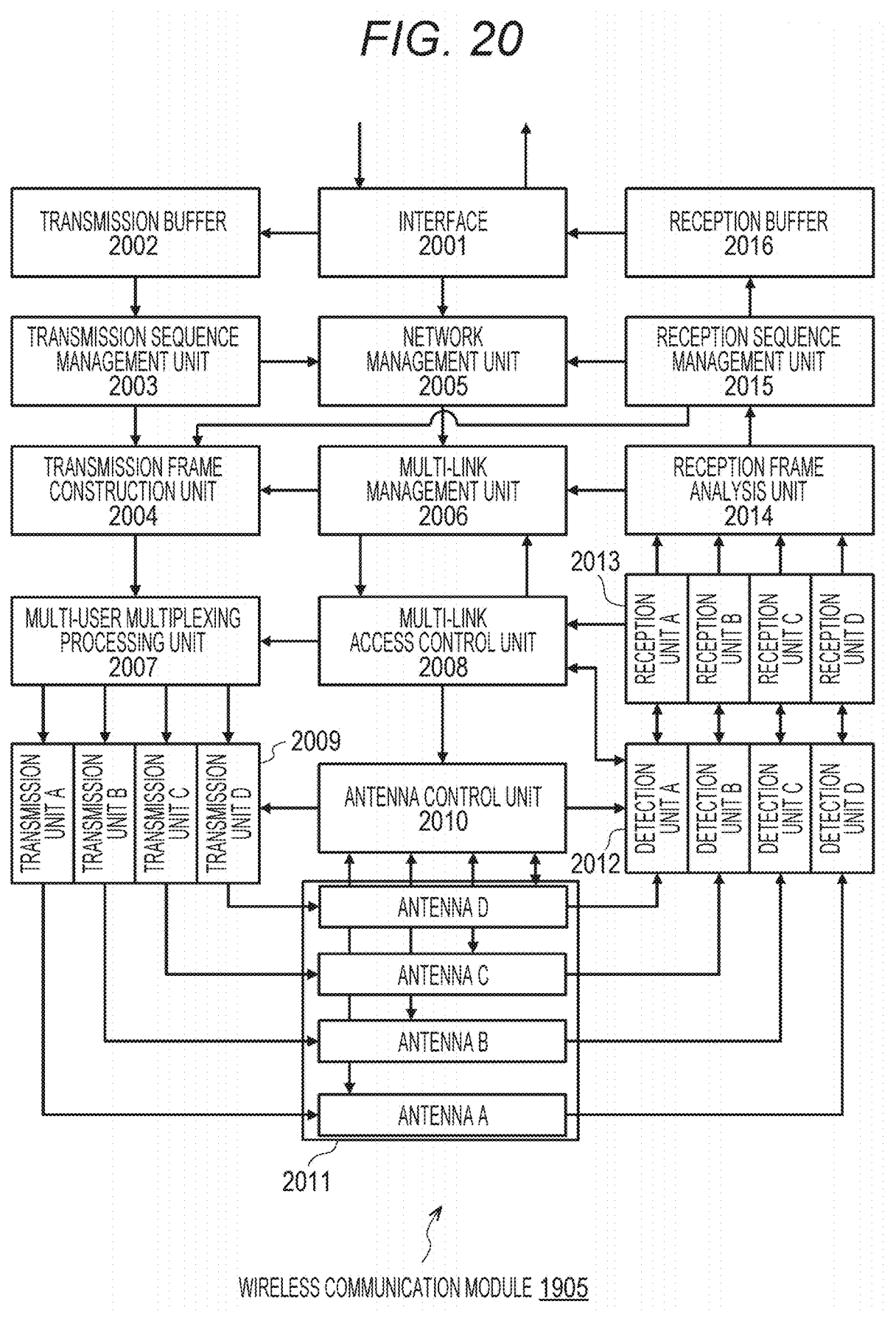

FIG. 20 illustrates an internal configuration of the wireless communication module 1905 that is one of the functional modules included in the wireless communication device 1900 illustrated in FIG. 19, in detail. The illustrated wireless communication module 1905 includes an interface 2001, a transmission buffer 2002, a transmission sequence management unit 2003, a transmission frame construction unit 2004, a network management unit 2005, a multi-link management unit 2006, a multi-user multiplexing processing unit 2007, a multi-link access control unit 2008, a transmission unit 2009, an antenna control unit 2010, an antenna unit 2011, a detection unit 2012, a reception unit 2013, a reception frame analysis unit 2014, a reception sequence management unit 2015, and a reception buffer 2016.

The interface 2001 is connected to other modules (device control module 1903 and the like) in the wireless communication device 1900, and exchanges various types of information and data.

The transmission buffer 2002 temporarily stores, for example, data received from other modules and to be transmitted wirelessly.

The transmission sequence management unit 2003 grasps data to be transmitted for each destination and manages the transmission sequence. The transmission frame construction unit 2004 constructs a transmission frame for each destination.

The network management unit 2005 manages each of information of an access point that belongs to a network of the wireless communication device 1900 (BSS) and information of a communication terminal. The multi-link management unit 2006 manages operation of the MLO.

The multi-user multiplexing processing unit 2007 performs processing for multi-user multiplex communication.

The multi-link access control unit 2008 controls transmission and reception on the basis of a predetermined access control procedure on each link of multi-links.

The transmission unit 2009 performs transmission processing of data to be transmitted. The transmission unit 2009 includes a plurality of (the number corresponding to the number of the multi-links of) transmission units A to D in order to individually transmit each link of the multi-links and user multiplexed data. Note that, in FIG. 20, the four transmission units A to D are illustrated for convenience, but the number of transmission units may be three or less or five or more. However, in a case where the wireless communication device 1900 is an EMLSR device, the transmission unit 2009 may be only one transmission unit.

The antenna control unit 2010 controls an antenna that transmits and receives signals. The antenna unit 2011 includes an antenna element that actually performs transmission and reception operation. As the antenna unit 2011, the number of antennas A to D corresponding to the number of the multi-links is prepared as necessary, but may be three or less or five or more.

The detection unit 2012 detects a signal received by the antenna unit 2011. The detection unit 2012 includes a plurality of (the number corresponding to the number of the multi-links of) detection units A to D. Note that, in FIG. 20, the four detection units A to D are illustrated for convenience, but the number of detection units may be three or less or five or more. Provided that, even in a case where the wireless communication device 1900 is an EMLSR device, detection units corresponding to the number of the links are prepared.

The reception unit 2013 performs reception processing of data received via the antenna unit 2011 and the detection unit 2012. The reception unit 2013 includes a plurality of (the number corresponding to the number of the multi-links of) reception units A to D in order to individually receive each link of the multi-links and user multiplexed data. Note that, in FIG. 20, the four reception units A to D are illustrated for convenience, but the number of reception units may be three or less or five or more. However, in a case where the wireless communication device 1900 is an EMLSR device, the transmission unit 2009 may be only one reception unit.

The reception frame analysis unit 2014 decodes predetermined data from a signal received by each of the reception units A to D to construct reception data. The reception sequence management unit 2015 extracts a portion of data (payload) from a received frame and manages a received sequence. The reception buffer 2016 temporarily stores received data.

In a case where the wireless communication device 1900 operates as an access point, transmission processing of TR and AL is instructed by the multi-link management unit 2006, and the TR and AL are each constructed as a transmission frame by the transmission frame construction unit 2004.

Furthermore, in a case where the wireless communication device 1900 operates as an access point, RR transmitted from communication terminals is each processed by each of the reception units A to D for each individual link and each individual user, and processed as received frames in the reception frame analysis unit 2014.

Furthermore, in a case where the wireless communication device 1900 operates as an access point, a BA frame is constructed according to the reception status of data addressed to the wireless communication device 1900 in the reception sequence management unit 2015, and the transmission frame construction unit 2004 constructs the BA frame.

On the other hand, in a case where the wireless communication device 1900 operates as a communication terminal and receives TR, the reception frame analysis unit 2014 recognizes the TR, the multi-link management unit 2006 collects information of TXOP, sets RR to be transmitted to the access point, and the transmission frame construction unit 2004 constructs an RR frame.

Furthermore, in a case where the wireless communication device 1900 operates as a communication terminal and receives AL from the access point of the connection destination, the reception frame analysis unit 2014 recognizes the AL, and the multi-link management unit 2006 instructs transmission processing using a resource of UL MU communication allocated by the AL.

H. Frame Configuration

In this item H, a configuration of a frame used in the wireless LAN system to which the present disclosure is applied will be described.

Figures 21, 22:
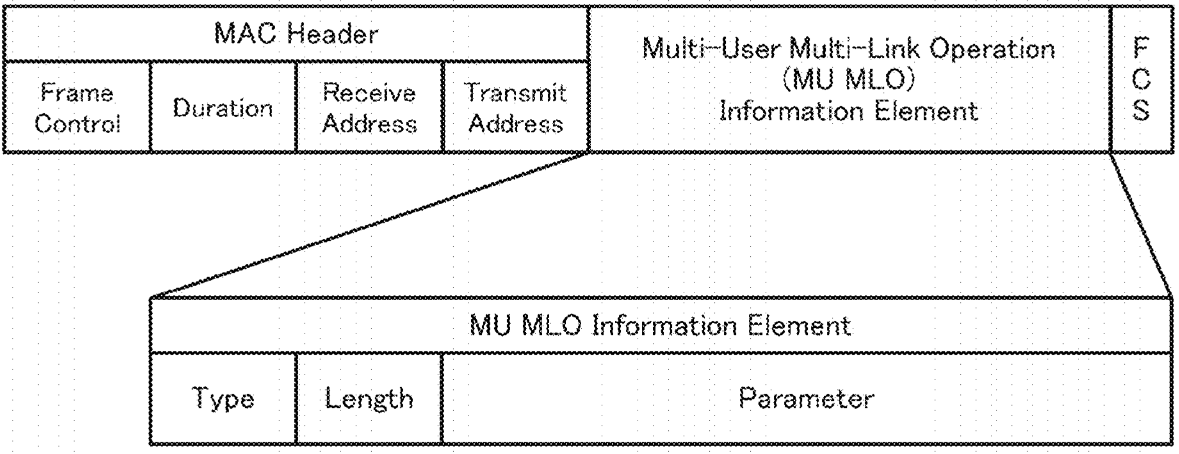
FIG. 21 is a diagram illustrating a configuration of a management frame necessary for setting the MLO.
FIG. 22 is a diagram illustrating frame formats corresponding to respective values described in a Type field of an MU MLO information element.

FIG. 21 illustrates a configuration of a management frame necessary for setting the MLO. The management frame here includes a UL Trigger Request (TR) frame, a UL Request Response (RR) frame, and a UL Allocation (AL) frame.

The frame illustrated in FIG. 21 includes, as a predetermined media access control (MAC) header, each field of Frame Control for identifying a type of the frame, Duration indicating duration of the frame, Receive Address for designating a reception-side device, and Transmit Address for designating a transmission-side device.

Furthermore, the frame illustrated in FIG. 21 includes a Multi-User Multi-Link Operation (MU MLO) information element (Information Element) as an MAC payload, and a frame check sequence (FCS) for data error detection is further added to the end of the frame.

As the MU MLO information element, Type indicating the format of the frame of the MU MLO, Length indicating the information length, and a parameter required for actual MLO operation are described. The configuration of the MU MLO information element is different for each management frame. Details of the configuration of the information element in each management frame will be described below.

FIG. 22 illustrates a correspondence relationship between values described in a Type field of the MU MLO information element and frame formats corresponding to the respective values. In the drawing, 1: DL Trigger Request, 2: DL Request Response, 3: DL Allocation, 5: UL Trigger Request, 6: UL Request Response, and 7: UL Allocation are defined.

Figure 23:
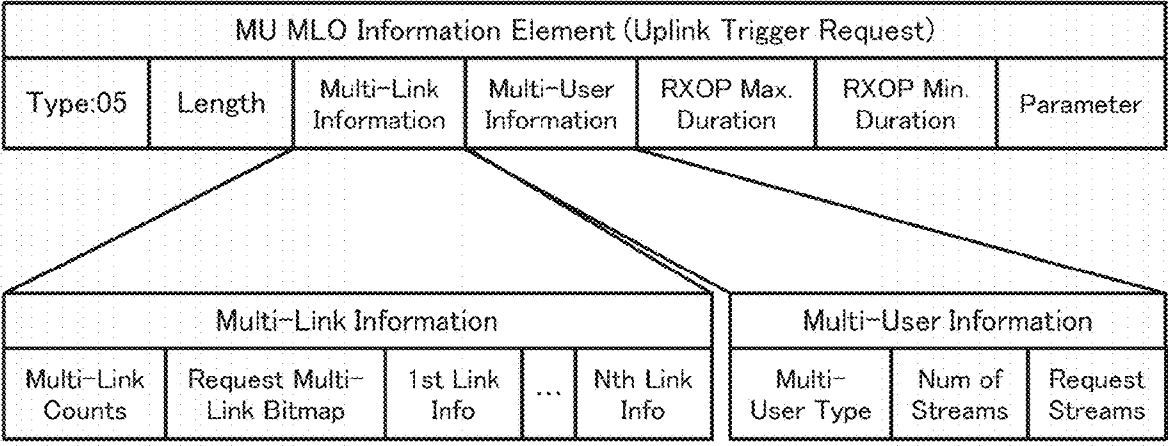
FIG. 23 is a diagram illustrating a configuration of an MU MLO Information Element field of an Uplink Trigger Request (TR) frame.

FIG. 23 illustrates a configuration of an MU MLO Information Element field of the UL Trigger Request (TR) frame.

This information element is indicated as an MU MLO information element of the UL Trigger Request assuming Type=05. Moreover, this information element includes Multi-Link Information indicating parameters related to multi-link operation, Multi-User Information indicating parameters related to multi-user communication, RXOP Max. Duration indicating the maximum length of a reception opportunity of uplink communication, RXOP Min. Duration similarly indicating the minimum necessary length, and other parameters added as necessary. On a communication terminal side that has received a TR frame, a remaining time of a reception opportunity held by the transmission source of the TR frame can be estimated on the basis of information of the maximum length of the reception opportunity described in the RXOP Max. Duration. Note that, in addition to this, any parameter Parameter may be described as necessary.

The Multi-Link Information field includes parameters of Multi-Link Counts indicating the number of the multi-links, Request Multi-Link Bitmap for identifying a channel of a requested multi-link in a bitmap format, 1st Link Info to Nth Link Info indicating information of first to Nth links, and the like.

Furthermore, the Multi-User Information field includes parameters of Multi-User Type indicating a multi-user multiplexing method, Number of Streams indicating the number of multiplexing per link, Request Streams indicating the number of request streams requested to be simultaneously received by a reception-side communication terminal, and the like.

Figure 24:
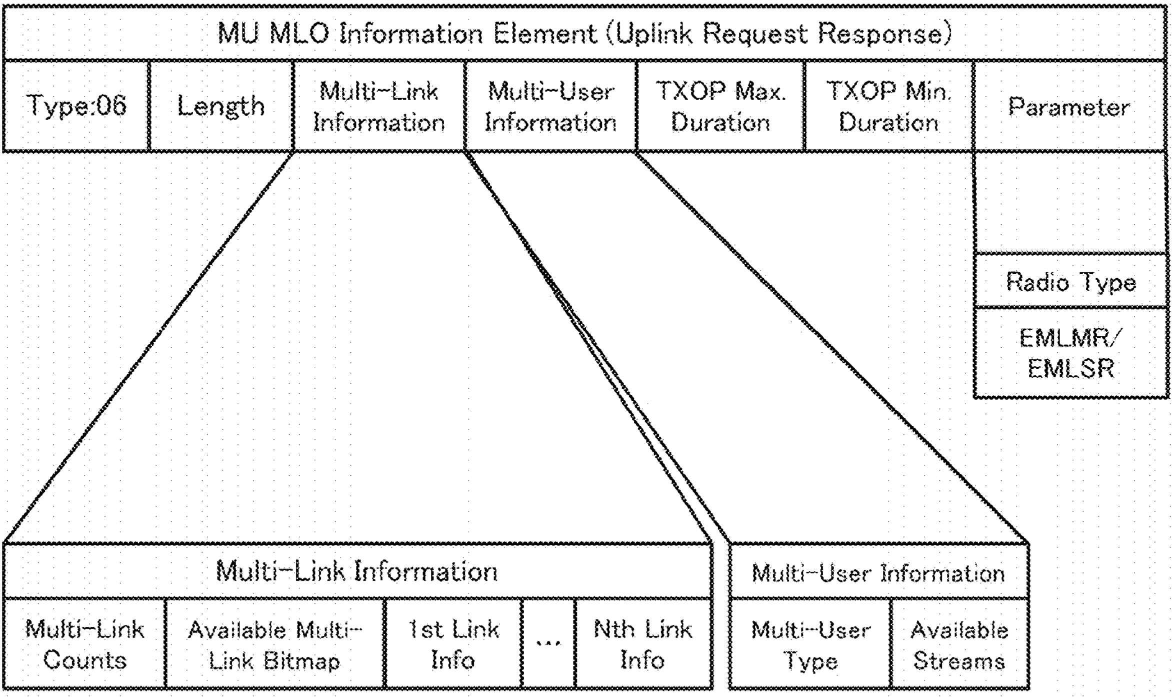
FIG. 24 is a diagram illustrating a configuration of an MU MLO Information Element field of a UL Request Response (RR) frame.

FIG. 24 illustrates a configuration of an MU MLO Information Element field of the UL Request Response (RR) frame.

This information element is indicated as an MU MLO information element of the UL Request Response assuming Type=06. Moreover, this information element includes Multi-Link Information indicating parameters related to multi-link operation, Multi-User Information indicating parameters related to multi-user communication, TXOP Max. Duration indicating the maximum length of a transmission opportunity of uplink communication, TXOP Min. Duration similarly indicating the minimum necessary length, and other parameters Parameter added as necessary.

The Multi-Link Information field includes parameters of Multi-Link Counts indicating the number of the multi-links, Available Multi-Link Bitmap for identifying a channel of an available multi-link in a bitmap format, 1st Link Info to Nth Link Info indicating information of first to Nth links, and the like.

Furthermore, the Multi-User Information field includes parameters of Multi-User Type indicating a multi-user multiplexing method, Number of Streams indicating the number of multiplexing per link, Available Streams indicating the number of available streams, and the like.

Furthermore, this information element includes information of EMLSR/EMLMR for identifying whether the communication terminal is an EMLSR or EMLMR device and the like as other parameters Parameter.

FIG. 25 illustrates a configuration of an MU MLO Information Element field of the UL Allocation (AL) frame.

This information element is indicated as an MU MLO information element of the UL Allocation assuming Type=07. Moreover, this information element includes parameters of Multi-Link Information indicating parameters related to multi-link operation, Multi-User Information indicating parameters related to multi-user communication, Current RXOP Duration indicating a reception opportunity of uplink communication in the Allocation frame, Total RXOP Duration indicating a reception opportunity in a case where usage is continuing, and, as other parameters added as necessary, ACK Policy indicating a method of returning ACK, After Allocation indicating later resource allocation, and the like. The ACK Policy parameter can be used for performing notification of allocation of a resource for returning block ACK.

The Multi-Link Information field includes parameters of Multi-Link Counts indicating the number of the multi-links, Allocate Multi-Link Bitmap for identifying a channel of an allocated multi-link in a bitmap format, Multi-Link Allocation corresponding to parameters of a bandwidth of a link on which the Allocation frame is transmitted and the like, and the like.

Furthermore, the Multi-User Information field includes parameters of Multi-User Allocation indicating a multi-user multiplexing method, Number of Streams indicating the number of multiplexing per link, 1st Used Info to Mth User Info indicating first to Mth user information, and the like. Each piece of user information includes parameters of Resource indicating an allocated resource, a parameter of Device for identifying a device and the like.

Figure 26:
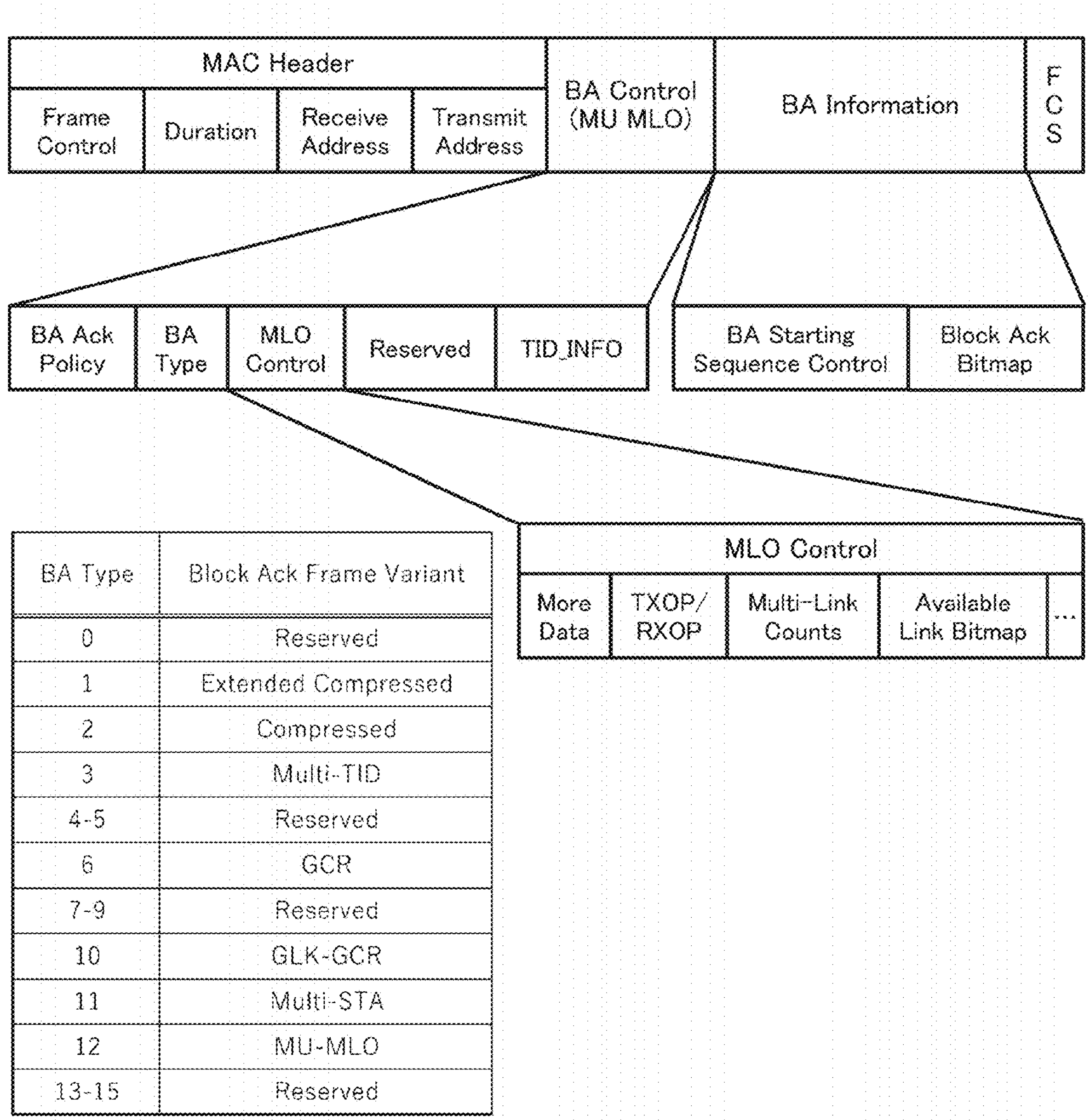
FIG. 26 is a diagram illustrating a configuration of an uplink Block Acknowledgement (BA) frame.

FIG. 26 illustrates a configuration of an uplink Block Acknowledgement (BA) frame. The BA frame has a configuration in which information corresponding to a conventional BA frame is described, includes each field of BA Control and BA Information subsequent to a predetermined MAC header (same as above), and FCS for error detection is added at the end.

The BA Control field includes each parameter of BA Ack Policy, BA Type, MLO Control, and TID INFO. The BA Type indicates a format of the BA frame. FIG. 26 also illustrates a correspondence relationship between values described in the BA Type field and BA frame formats corresponding to the respective values. In the present embodiment, 12: MU MLO is defined as a new BA Type.

Furthermore, in the present embodiment, an MLO Control parameter is described in a bit portion that has been conventionally Reserved in the BA Control field as necessary. The MLO Control includes parameters of More Data indicating that more data is required, TXOP/RXOP for identifying whether TXOP or RXOP can be set, Multi-Link Counts indicating the number of links capable of multi-link operation, Available Link bitmap indicating available links in a bitmap format, and the like.

I. Operation Example of Uplink Communication

In this item I, operation performed by an access point and a communication terminal during uplink communication in the wireless LAN system to which the present disclosure is applied will be described.

Figure 27:
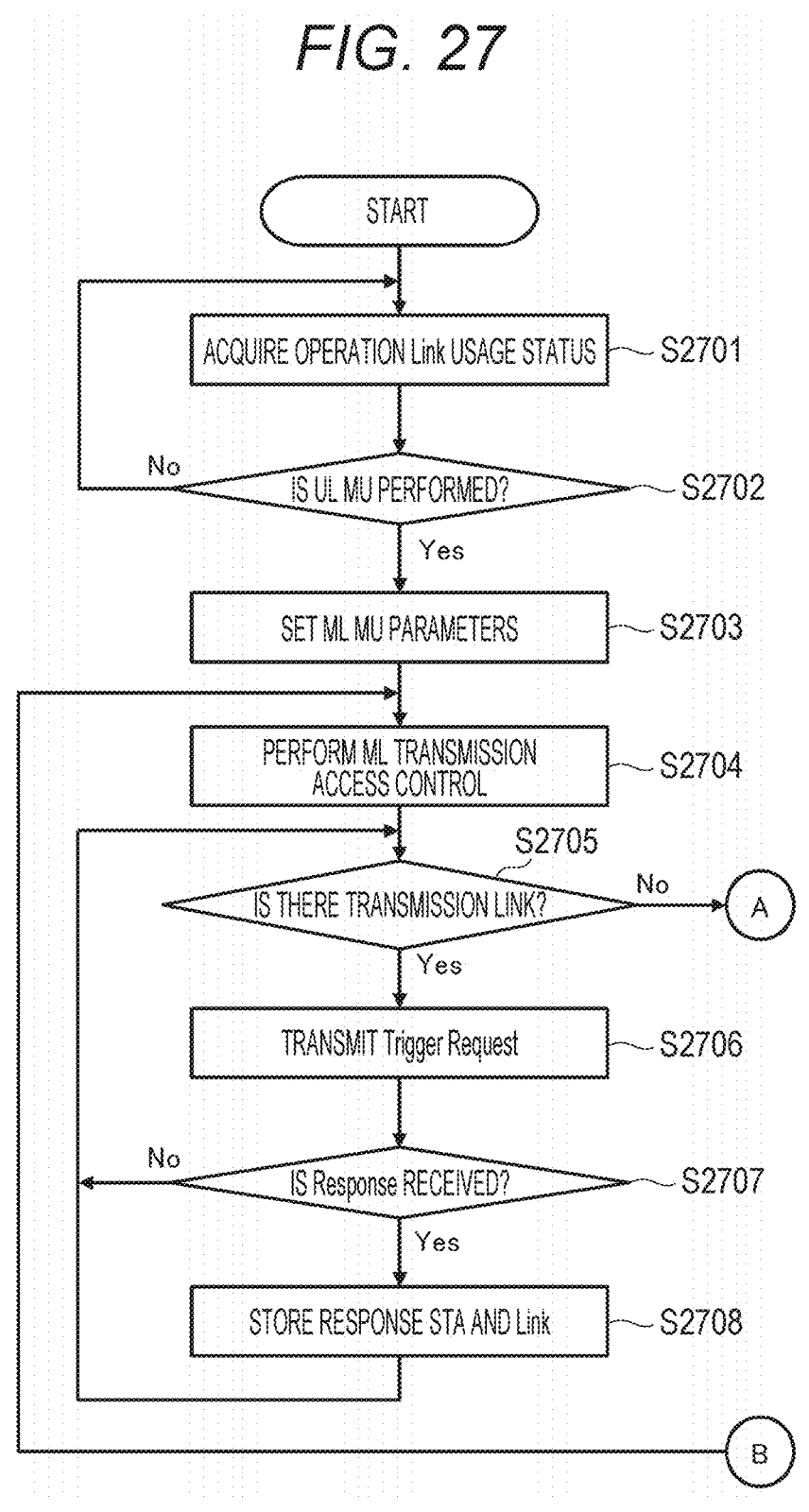

FIGS. 27 and 28 illustrate operation performed by an access point during uplink communication in the form of flowcharts. Here, an operation sequence of activating uplink multi-user multiplex communication according to the present disclosure by transmitting a trigger from the access point as a part of the MLO is illustrated in the form of flowcharts.

First, the access point acquires a usage status in each link at any timing (step S2701), determines an arrival status of data addressed to the access point, and determines whether to perform uplink multi-user communication (step S2702).

Then, in a case where uplink multi-user communication is performed in multi-links (Yes in step S2702), the access point sets multi-user and multi-link parameters (step S2703), and performs access control on each link that performs multi-link operation (step S2704).

Here, in a case where there is a link on which transmission can be performed (Yes in step S2705), the access point transmits a trigger request (Trigger Request: TR) frame on the link (step S2706), and in a case where a response (Request Response: RR) frame is received from a communication terminal on the link (Yes in step S2707), the access point sequentially stores the communication terminal that has responded and the response parameter together with the corresponding link information (step S2708).

Then, returning to step S2705, the access point transmits the TR frame on all links available for transmission.

Thereafter, upon ending reception of RR frames on all the links available for transmission (Yes in step S2705), the access point acquires information of the RR frames returned from communication terminals on each of the links (step S2709), and checks whether the response is from a device having large restriction on available links or available resources like an EMLSR device (step S2710). Furthermore, in a case where the response is not from a device having large restriction on available links or available resources like an EMLSR device (No in step S2710), the access point checks whether the response is from a communication terminal in which undelivered data exists (step S2711).

Then, in a case where the response is from a device having large restriction on available links or available resources like an EMLSR device (Yes in step S2710), or in a case where the response is from a communication terminal in which undelivered data exists (No in step S2711), the access point is formed to preferentially allocate a resource on the response link (step S2712), and in a case where the response is from a communication terminal other than that (Yes in step S2711), the access point is formed to appropriately allocate a remaining resource (step S2713). In steps S2712 and S2713, the access point sets parameters related to multi-link operation on the basis of the allocated resources, and also sets parameters related to multi-user communication.

Here, upon completing resource allocation for all communication terminals that have responded (Yes in step S2714), the access point checks whether there is a remaining resource (step S2715). Then, in a case where there is a remaining resource (step S2715), the access point may allocate a resource for data transmission for random access as necessary (step S2716).

Next, the access point generates an AL frame in which the parameters related to multi-link operation set in step S2712 or S2713 and the parameters related to multi-user communication are described, and transmits the Allocation (AL) frame on available links (step S2717). Thereafter, the access point receives uplink multi-user multiplexed data on the basis of the parameters related to multi-link operation and multi-user communication set in steps S2712 and S2713 in each of the links (step S2718).

Next, the access point checks whether the data (MAC Protocol Data Unit: MPDU) has been able to be normally received (step S2719). In a case where the data has been able to be normally received (Yes in step S2719), the access point stores the data in the reception buffer 2016 (step S2720), and stores a received sequence number as ACK information (S2721). Note that, in a case where there is an error in the reception data (No in step S2719), subsequent steps S2720 and S2721 are skipped, the reception data is not stored, and the sequence number is also not stored as ACK information.

Then, until the processing is completed for all multi-link and multi-user multiplexed data (No in step S2722), the processing returns to step S2719, and the access point repeatedly performs the reception processing described above.

Upon ending the reception of all the multi-link and multi-user multiplexed data (Yes in step S2722), subsequently, the access point checks whether setting of a reception opportunity (RXOP) is continuing and whether there is data that needs to be retransmitted (step S2723). In a case where the setting of the RXOP is continuing (Yes in step S2723), the access point sets a parameter for allocating a resource again (step S2724), and in a case where there is undelivered data, the access point transmits Block ACK (BA) that can identify the data using the resource allocated by the ACK Policy parameter of the AL frame (step S2725). Note that the BA frame and the AL frame for next MLO may be transmitted simultaneously.

In a case where there is undelivered data, or in a case where uplink multi-user multiplex communication needs to be performed (Yes in step S2726), the access point returns to step S2704 and continues operation of uplink multi-user multiplex communication.

On the other hand, in a case where there is no undelivered data, or in a case where it is determined that normal data reception processing is sufficient and the uplink multi-user multiplex communication does not need to be performed (No in step S2726), the access point ends a series of uplink multi-user multiplex communication.

Figure 30:
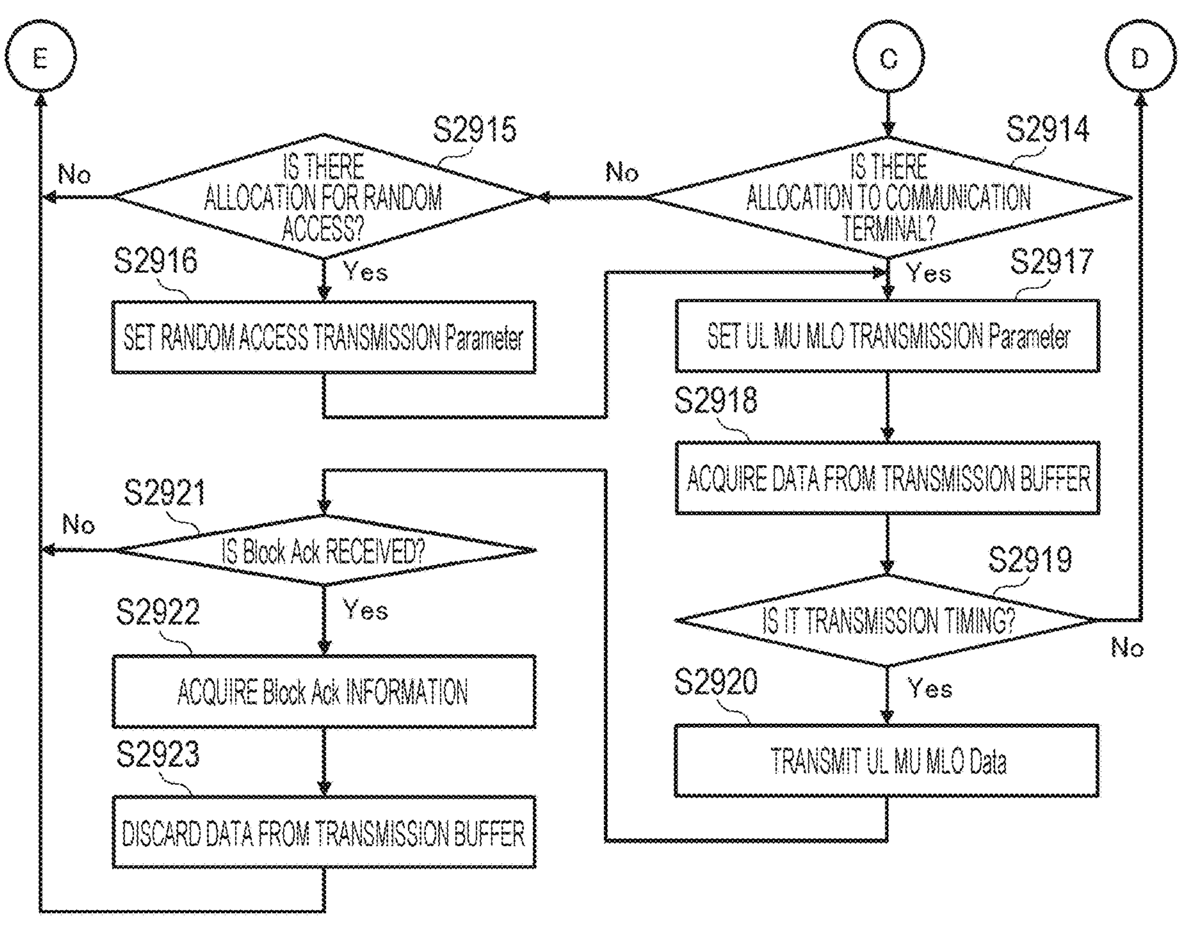
FIG. 30 is a flowchart illustrating operation performed by the communication terminal during the uplink communication.

FIGS. 29 and 30 illustrate operation performed by a communication terminal during uplink communication in the form of flowcharts. Here, an operation sequence of activating uplink multi-user multiplex communication according to the present disclosure by the communication terminal receiving a trigger from the access point as a part of the MLO is illustrated in the form of flowcharts.

First, in a case where uplink transmission data from the upper layer of the communication protocol to the access point is received (Yes in step S2901), the communication terminal stores the data in the transmission buffer 2002 (step S2902).

Then, the communication terminal performs reception operation on an operation link of multi-link operation (step S2903). The communication terminal may perform detection operation of a predetermined preamble signal on the multi-links even in a case of a device having large restriction on available links or available resources like an EMLSR device.

Here, in a case where a signal addressed to another network (OBSS) or another communication device has been received (Yes in step S2904), the communication terminal sets a BUSY state on the link, or in a case where an RTS or a CTS frame has been received or the like, the communication terminal sets an NAV for virtual carrier sense according to time information of Duration described therein or the like (step S2905).

Upon receiving a trigger request (Trigger Request: TR) frame for downlink multi-user multiplex communication from the access point (Yes in step S2906), the communication terminal acquires a parameter of the data amount of the transmission buffer 2002 (step S2907), and checks whether uplink data transmission is necessary on the link (step S2908). Then, in a case where uplink data transmission is necessary (Yes in step S2908), the communication terminal sets an uplink transmission parameter (step S2909).

Here, in a case where the communication terminal is a device having large restriction on available links or available resources like an EMLSR device, or in a case where a link to be used is identified (Yes in step S2910), an RTS frame is transmitted to the access point as necessary (step S2911).

Furthermore, in a case where the communication terminal is not a device having large restriction on available links or available resources like an EMLSR device, or in other cases where there is no need (No in step S2910), the communication terminal transmits a response (Request Response: RR) frame (step S2912).

Then, the communication terminal waits for an Allocation (AL) frame from the access point on the link on which these frames have been transmitted (step S2913).

In a case where the AL frame is received from the access point (Yes in step S2913), the communication terminal checks whether there is resource allocation to the communication terminal (step S2914).

Here, in a case where a resource has been allocated to the communication terminal by the AL frame (Yes in step S2914), the communication terminal sets a parameter for uplink multi-user multiplex communication (step S2917), acquires data from the transmission buffer 2002 (step S2918), and in a case where designated timing arrives (Yes in step S2919), the communication terminal performs transmission of the uplink multi-user multiplex communication (step S2920).

On the other hand, in a case where no resource is allocated to the communication terminal by the AL frame (No in step S2914), the communication terminal further checks whether there is resource allocation for random access (step S2915). Then, in a case where there is resource allocation for random access (Yes in step S2915), the communication terminal can transmit data of later uplink multi-user communication according to the setting of the transmission parameter for random access (step S2916).

Note that, here, since a case where a plurality of links and a plurality of pieces of multi-user multiplex communication are allocated is also assumed, the communication terminal repeats processing of setting corresponding transmission data until the transmission timing arrives.

After the transmission of the data, in a case where a BA frame from the access point is received by the resource designated by the ACK Policy parameter of the AL frame (Yes in step S2921), the communication terminal acquires the sequence number of data that has been received from the frame (step S2922) and performs discard in the transmission buffer 2002 (step S2923).

Then, in a case where there is data addressed to the access point, the communication terminal repeatedly performs the above-described series of operation.

Note that the communication terminal may appropriately perform communication addressed to the access point without performing the uplink multi-user multiplex communication described above in a case where a transmission opportunity of the communication terminal arrives.

J. Effects

In this item J, effects brought about by the present disclosure are summarized.

(1) An access point can receive TXOP information from communication terminals on links on which reception can be performed in multi-links, and designate a link on which uplink multi-user multiplex communication is performed for each of the communication terminals.

(2) In an environment where an OBSS exists, even in a case where the multi-links are unavailable in all the transmission-side communication devices, multi-user communication can be performed using links available to the transmission-side communication devices each time.

(3) Also in an EMLSR device, TXOP information can be returned to the access point on a currently used link, and which link is available for uplink communication can be grasped on the basis of an AL frame from the access point.

(4) Through an interaction in which the access point transmits Trigger Request and the communication terminals return Request Response, the access point can identify available links at that time.

(5) The access point can allocate an optimum link to each of the communication terminals from a situation grasped on the basis of the Request Response returned from the communication terminals, and can implement multi-link operation using a transmission opportunity obtained by each of the communication terminals without waste.

(6) The communication terminals can grasp whether retransmission is necessary by the access point returning Block ACK as necessary, and in a case where the transmission paths are continuously available, the communication terminals can return a response in which TXOP information is described again and continuously perform communication.

(7) An opportunity to transmit a request to the access point can be given by a resource for transmission of data having a high random access property being also allocated among resources to be uplink multi-user multiplexed and transmitted from any transmission-side communication terminal.

Therefore, according to the present disclosure, transmission paths can be used without waste by a method of allocating a communication resource to a more optimum communication terminal not only by granting a transmission right to one communication terminal for each link as in the conventional art, but also by using the technology of the multi-user multiplex communication being obtained, and multi-user communication being applied to multi-link operation.

INDUSTRIAL APPLICABILITY

The present disclosure is heretofore described in detail with reference to the specific embodiment. However, it is obvious that those skilled in the art can make modifications and substitutions of the embodiment without departing from the gist of the present disclosure.

The present disclosure is applied to, for example, a network environment in which using all channels is difficult in multi-link operation, and each communication terminal notifies an access point of a multi-link in which a transmission opportunity can be set, the access point allocates a link on which each communication terminal transmits data on the basis of information in the notification, and each communication terminal can implement uplink multi-user multiplex communication using a multi-link channel available to each other. Furthermore, according to the present disclosure, since the access point sets a transmission opportunity of uplink multiplex communication to each subordinate communication terminal and performs data transmission, a resource of a link on which a communication terminal that is EMLSR is operating is also effectively allocated to the communication terminal. That is, according to the present disclosure, throughput in the entire network can be improved by application to a network environment in which multi-link operation using all channels is difficult.

Needless to say, the present disclosure is also applied to a network in which multi-link operation using all channels is easy, and the access point efficiently allocates a resource of a link on which each communication terminal transmits data according to the amount of data to be transmitted from each communication terminal and the like, thereby improving the throughput in the entire network.

Furthermore, in the present specification, the embodiment in which the present disclosure is applied to a wireless LAN system based on the IEEE 802.11 standard has been mainly described, but the application range of the present disclosure is not limited to a specific wireless standard, and the present disclosure can be similarly applied to various types of wireless networks.

In short, the present disclosure is heretofore described in a form of an example and the content described in this specification should not be interpreted in a limited manner. In order to determine the gist of the present disclosure, the claims should be taken into consideration.

Note that the present disclosure can have the following configurations.

(1) A communication device including a communication unit capable of wirelessly communicating on a plurality of links, a communication processing unit that performs processing of simultaneously receiving data from a plurality of transmission-side communication devices, and a control unit that performs control to receive data using an optimum link from each of the plurality of transmission-side communication devices.

(2) The communication device according to (1) described above, in which the control unit performs control to transmit a trigger request signal for requesting information regarding a transmission opportunity from the plurality of transmission-side communication devices on a link on which a reception opportunity has been acquired.

(3) The communication device according to (2) described above, in which the control unit performs control to receive a request response signal for responding to the trigger request signal.

(4) The communication device according to (3) described above, in which the control unit determines an optimum link for each transmission-side communication device on the basis of a request response signal from the plurality of transmission-side communication devices.

(5) The communication device according to (4) described above, in which the control unit determines an optimum link for each transmission-side communication device with a request response signal received from a transmission-side communication device having large restriction on a communication resource prioritized.

(6) The communication device according to any one of (1) to (5) described above, in which the control unit performs control to transmit an allocation signal including information regarding a link allocated to each transmission-side communication device and information regarding multi-user multiplex communication.

(7) The communication device according to (4) described above, in which the control unit controls simultaneous data reception from the plurality of transmission-side communication devices using the plurality of links on the basis of information regarding a link allocated to each transmission-side communication device and information regarding multi-user multiplex communication.

(8) The communication device according to any one of (1) to (7) described above, in which the control unit performs control to allocate a resource for receiving block ACK to the plurality of transmission-side communication devices.

(9) The communication device according to (6) or (7) described above, in which the control unit repeatedly transmits the allocation signal in a case where there is a remaining time of the reception opportunity.

(10) A communication method in a communication device capable of wirelessly communicating on a plurality of links, the method including a step of determining an optimum link for each of the plurality of transmission-side communication devices, and a step of simultaneously receiving data from a plurality of reception-side communication devices using an optimum link of each transmission-side communication device.

(11) A communication device including a communication unit capable of wirelessly communicating on a plurality of links, a communication processing unit that performs processing of receiving data addressed to the communication device among data simultaneously transmitted from a reception-side communication device to a plurality of transmission-side communication devices, and a control unit that notifies the reception-side communication device of a transmission opportunity of a link available to the communication device, and performs control to transmit data simultaneously with another transmission-side communication device on a link designated by the reception-side communication device.

(12) The communication device according to (11) described above, in which the control unit performs control to return a request response signal on a link on which a transmission opportunity has been acquired in response to reception of a trigger request signal from the reception-side communication device.

(13) The communication device according to (12) described above, in which the control unit performs control to return a request response signal on an all link on which a transmission opportunity has been able to be acquired.

(14) The communication device according to any one of (11) to (13) described above, in which the control unit performs control to transmit a Request to Send signal on a link on which transmission is performed in a case where the communication unit or the communication processing unit has large restriction on a communication resource.

(15) The communication device according to (12) or (13) described above, in which the control unit performs control to wait for a signal on a link on which the request response signal has been transmitted.

(16) The communication device according to any one of (11) to (15) described above, in which the control unit receives an allocation signal including information regarding allocation of a transmission resource from the reception-side communication device, and performs control to transmit data to the reception-side communication device using a resource allocated to transmission of the communication device in the allocation signal.

(17) The communication device according to (16) described above, in which the control unit performs control to perform data transmission on the basis of resource allocation for random access in a case where no resource is allocated to transmission of the communication device in the allocation signal.

(18) The communication device according to any one of (11) to (15) described above, in which the control unit performs control to receive block ACK from the reception-side communication device on any link.

(19) The communication device according to any one of (11) to (18) described above, in which the control unit waits for a new allocation signal from the reception-side communication device in a case where there is a remaining time of a reception opportunity of the reception-side communication device.

(20) A communication method in a communication device capable of wirelessly communicating on a plurality of links, the method including a step of notifying a reception-side communication device of information regarding a transmission opportunity of a link available to the communication device, and a step of transmitting data addressed to the reception-side communication device simultaneously with another transmission-side communication device on a link designated by the reception-side communication device.

REFERENCE SIGNS LIST

1900 Wireless communication device
1901 Network connection module
1902 Information input module
1903 Device control module
1904 Information output module
1905 Wireless communication module
2001 Interface
2002 Transmission buffer
2003 Transmission sequence management unit
2004 Transmission frame construction unit
2005 Network management unit
2006 Multi-link management unit
2007 Multi-user multiplexing processing unit
2008 Multi-link access control unit
2009 Transmission unit
2010 Antenna control unit
2011 Antenna unit
2012 Detection unit
2013 Reception unit
2014 Reception frame analysis unit
2015 Reception sequence management unit
2016 Reception buffer

The invention claimed is:

1. A wireless communication device, comprising:

circuitry configured to:

identify, to perform uplink transmission on a first link, a first subset of wireless communication devices from at least one of a first set of wireless communication devices or a second set of wireless communication devices, wherein each of the first set of wireless communication devices and the second set of wireless communication devices is different from the wireless communication device;

identify, to perform uplink transmission on a second link, a second subset of wireless communication devices from the at least one of the first set of wireless communication devices or the second set of wireless communication devices;

notify, via the first link, the first subset of wireless communication devices of an allocation of a first transmission resource;

notify, via the second link, the second subset of wireless communication devices of an allocation of a second transmission resource;

control simultaneous reception of data from each of the first subset of wireless communication devices and the second subset of wireless communication devices;

control transmission of a first response to the first subset of wireless communication devices via the first link; and control transmission of a second response to the second subset of wireless communication devices via the second link.

2. The wireless communication device according to claim 1, wherein the circuitry is further configured to request information regarding a transmission opportunity from the at least one of the first set of wireless communication devices or the second set of wireless communication devices.

3. The wireless communication device according to claim 1, wherein the circuitry is further configured to control reception of information regarding a transmission opportunity from the at least one of the first set of wireless communication devices or the second set of wireless communication devices.

4. The wireless communication device according to claim 1, wherein the identification of the first subset of wireless communication devices and the identification of the second subset of wireless communication devices is based on at least one of Enhanced Multi-Link Multi Radio (EMLMR) capability of the at least one of the first set of wireless communication devices or the second set of wireless communication devices, or Enhanced Multi-Link Single Radio (EMLSR) capability of the at least one of the first set of wireless communication devices or the second set of wireless communication devices.

5. The wireless communication device according to claim 1, wherein the simultaneous reception is in a specific time duration, the specific time duration is associated with a reception opportunity, and in the specific time duration, the circuitry is further configured to:

identify, to perform uplink transmission on the first link, a third subset of wireless communication devices from a third set of wireless communication devices, wherein the third set of wireless communication devices includes the first set of wireless communication devices and the second set of wireless communication devices, and the third subset of wireless communication devices is different from each of the first subset of wireless communication devices and the second subset of wireless communication devices;

identify, to perform uplink transmission on the second link, a fourth subset of wireless communication devices from the third set of wireless communication devices, wherein the fourth subset of wireless communication devices is different from each of the first subset of wireless communication devices and the second subset of wireless communication devices;

notify, via the first link, the third subset of wireless communication devices of an allocation of a third transmission resource; and notify, via the second link, the fourth subset of wireless communication devices of an allocation of a fourth transmission resource.

6. The wireless communication device according to claim 1, wherein the transmission of the first response and the transmission of the second response is simultaneous.

7. The wireless communication device according to claim 1, wherein the circuitry is further configured to simultaneously notify the first subset of wireless communication devices of the allocation of the first transmission resource and notify the second subset of wireless communication devices of the allocation of the second transmission resource.

8. The wireless communication device according to claim 1, wherein the first link is in one of a 2.4 GHz band, a 5 GHz band, or a 6 GHz band, the second link is in one of the 2.4 GHz band, the 5 GHz band, or the 6 GHz band, and a frequency band of the first link is different from a frequency band of the second link.

9. A wireless communication method, comprising:

in a wireless communication device:

identifying, to perform uplink transmission on a first link, a first subset of wireless communication devices from at least one of a first set of wireless communication devices or a second set of wireless communication devices, wherein each of the first set of wireless communication devices and the second set of wireless communication devices is different from the wireless communication device;

identifying, to perform uplink transmission on a second link, a second subset of wireless communication devices from the at least one of the first set of wireless communication devices or the second set of wireless communication devices;

notifying, via the first link, the first subset of wireless communication devices of an allocation of a first transmission resource;

notifying, via the second link, the second subset of wireless communication devices of an allocation of a second transmission resource;

controlling simultaneous reception of data from the first subset of wireless communication devices and the second subset of wireless communication devices;

controlling transmission of a first response to the first subset of wireless communication devices via the first link; and controlling transmission of a second response to the second subset of wireless communication devices via the second link.

10. The wireless communication method according to claim 9, further comprising requesting information regarding a transmission opportunity from the at least one of the first set of wireless communication devices or the second set of wireless communication devices.

11. The wireless communication method according to claim 9, further comprising receiving information regarding a transmission opportunity from the at least one of the first set of wireless communication devices or the second set of wireless communication devices.

12. The wireless communication method according to claim 9, wherein each of the identification of the first subset of wireless communication devices and the identification of the second subset of wireless communication devices is based on at least one of Enhanced Multi-Link Multi Radio (EMLMR) capability of the at least one of the first set of wireless communication devices or the second set of wireless communication devices, or Enhanced Multi-Link Single Radio (EMLSR) capability of the at least one of the first set of wireless communication devices or the second set of wireless communication devices.

13. The wireless communication method according to claim 9, wherein the simultaneous reception is in a specific time duration, the specific time duration is associated with a reception opportunity, and the wireless communication method further comprises:

identifying, in the specific time duration, a third subset of wireless communication devices from a third set of wireless communication devices, to perform uplink transmission on the first link, wherein the third set of wireless communication devices includes the first set of wireless communication devices and the second set of wireless communication devices, and the third subset of wireless communication devices is different from each of the first subset of wireless communication devices and the second subset of wireless communication devices;

identifying, in the specific time duration, a fourth subset of wireless communication devices from the third set of wireless communication devices, to perform uplink transmission on the second link, wherein the fourth subset of wireless communication devices is different from each of the first subset of wireless communication devices and the second subset of wireless communication devices;

notifying, via the first link, the third subset of wireless communication devices of an allocation of a third transmission resource in the specific time duration; and notifying, via the second link, the fourth subset of wireless communication devices of an allocation of a fourth transmission resource in the specific time duration.

14. The wireless communication method according to claim 9, wherein the transmission of the first response to the first subset of wireless communication devices and the transmission of the second response to the second subset of wireless communication devices is simultaneous.

15. The wireless communication method according to claim 9, further comprising simultaneously notifying the first subset of wireless communication devices of the allocation of the first transmission resource and notifying the second subset of wireless communication devices of the allocation of the second transmission resource.

16. A wireless communication system, comprising:

a wireless communication device that includes circuitry;

a first set of wireless communication devices; and a second set of wireless communication devices, wherein each of the first set of wireless communication devices and the second set of wireless communication devices is different from the wireless communication device, and the circuitry is configured to:

identify, to perform uplink transmission on a first link, a first subset of wireless communication devices from at least one of the first set of wireless communication devices or the second set of wireless communication devices;

identify, to perform uplink transmission on a second link, a second subset of wireless communication devices from the at least one of the first set of wireless communication devices or the second set of wireless communication devices;

notify, via the first link, the first subset of wireless communication devices of an allocation of a first transmission resource;

notify, via the second link, the second subset of wireless communication devices of an allocation of a second transmission resource;

control simultaneous reception of data from each of the first subset of wireless communication devices and the second subset of wireless communication devices;

control transmission of a first response to the first subset of wireless communication devices via the first link; and control transmission of a second response to the second subset of wireless communication devices via the second link.

17. The wireless communication system according to claim 16, wherein the circuitry is further configured to request information regarding a transmission opportunity from the at least one of the first set of wireless communication devices or the second set of wireless communication devices.

18. The wireless communication system according to claim 16, wherein the circuitry is further configured to control reception of information regarding a transmission opportunity from the at least one of the first set of wireless communication devices or the second set of wireless communication devices.

19. The wireless communication system according to claim 16, wherein the simultaneous reception is in a specific time duration, the specific time duration is associated with a reception opportunity, and in the specific time duration, the circuitry is further configured to:

identify, to perform uplink transmission on the first link, a third subset of wireless communication devices from a third set of wireless communication devices, wherein the third set of wireless communication devices includes the first set of wireless communication devices and the second set of wireless communication devices, and the third subset of wireless communication devices is different from each of the first subset of wireless communication devices and the second subset of wireless communication devices;

identify, to perform uplink transmission on the second link, a fourth subset of wireless communication devices from the third set of wireless communication devices, wherein the fourth subset of wireless communication devices is different from each of the first subset of wireless communication devices and the second subset of wireless communication devices;

notify, via the first link, the third subset of wireless communication devices of an allocation of a third transmission resource; and notify, via the second link, the fourth subset of wireless communication devices of an allocation of a fourth transmission resource.

20. A wireless communication method, comprising:

in a wireless communication system:

identifying, to perform uplink transmission on a first link, a first subset of wireless communication devices from at least one of a first set of wireless communication devices or a second set of wireless communication devices, wherein the wireless communication system includes each of the first set of wireless communication devices and the second set of wireless communication devices and a specific wireless communication device;

identifying, to perform uplink transmission on a second link, a second subset of wireless communication devices from the at least one of the first set of wireless communication devices or the second set of wireless communication devices;

notifying, via the first link, the first subset of wireless communication devices of an allocation of a first transmission resource;

notifying, via the second link, the second subset of wireless communication devices of an allocation of a second transmission resource;

controlling simultaneous transmission of data, to the specific wireless communication device, from each of the first subset of wireless communication devices and the second subset of wireless communication devices, wherein the specific wireless communication device is different from each of the first set of wireless communication devices and the second set of wireless communication devices;

controlling transmission of a first response, from the specific wireless communication device to the first subset of wireless communication devices via the first link; and controlling transmission of a second response, from the specific wireless communication device to the second subset of wireless communication devices via the second link.

* * * * *